(12) United States Patent
Toyoizumi et al.

(10) Patent No.: US 6,838,538 B2
(45) Date of Patent: Jan. 4, 2005

(54) HYDROGENATED MODIFIED POLYMER, PROCESS FOR PRODUCING THE SAME AND COMPOSITION CONTAINING THE SAME

(75) Inventors: Takashi Toyoizumi, Mie (JP); Motokazu Takeuchi, Mie (JP); Masashi Shimakage, Mie (JP); Nobuyuki Toyoda, Mie (JP); Kazuhisa Kodama, Mie (JP); Iwakazu Hattori, Mie (JP)

(73) Assignee: JSR Corporation, Tokyo (JP)

( * ) Notice: Subject to any disclaimer, the term of this patent is extended or adjusted under 35 U.S.C. 154(b) by 55 days.

(21) Appl. No.: 10/105,317

(22) Filed: Mar. 26, 2002

(65) Prior Publication Data

US 2003/0100683 A1 May 29, 2003

(30) Foreign Application Priority Data

| Mar. 26, 2001 | (JP) | ................................. | 2001-088390 |
| Sep. 4, 2001 | (JP) | ................................. | 2001-267740 |
| Dec. 21, 2001 | (JP) | ................................. | 2001-390671 |

(51) Int. Cl.$^7$ .............................................. C08F 112/34
(52) U.S. Cl. ........................ 526/336; 526/338; 526/347
(58) Field of Search ............................... 526/336, 338, 526/347

(56) References Cited

U.S. PATENT DOCUMENTS

| 4,853,440 A | 8/1989 | Roggero et al. |
| 4,972,023 A | 11/1990 | Bronstert |
| 5,545,691 A | 8/1996 | Bening et al. |
| 5,910,547 A | 6/1999 | Schwindeman et al. |
| 6,111,045 A | * 8/2000 | Takagishi et al. ........... 526/338 |
| 6,627,721 B1 | * 9/2003 | Rodewald et al. .......... 526/338 |

FOREIGN PATENT DOCUMENTS

| JP | 43-19960 | 8/1968 |
| JP | 47-40473 | 10/1972 |
| JP | 59-133203 | 7/1984 |
| JP | 61-183337 | 8/1986 |
| JP | 62-079252 | 4/1987 |
| JP | 62-218403 | 9/1987 |
| JP | 63-005401 | 1/1988 |
| JP | 63-081113 | 4/1988 |
| JP | 63-099257 | 4/1988 |
| JP | 63-254119 | 10/1988 |
| JP | 01-275605 | 11/1989 |
| JP | 02-263851 | 10/1990 |
| JP | 05-222115 | 8/1993 |
| JP | 05-271325 | 10/1993 |
| JP | 05-271326 | 10/1993 |
| JP | 07-090017 | 4/1995 |
| JP | 07-165997 | 6/1995 |
| JP | 10-279736 | 10/1998 |
| JP | 11-292924 | 10/1999 |
| JP | 2000-037632 | 2/2000 |
| JP | 2000-340034 | 12/2000 |
| WO | WO 96/33223 | 10/1996 |

\* cited by examiner

*Primary Examiner*—Robert D. Harlan
(74) *Attorney, Agent, or Firm*—Oblon, Spivak, McClelland, Maier & Neustadt, P.C.

(57) ABSTRACT

An objective of the present invention is to provide a hydrogenated modified polymer which can afford a molded body excellent in improvement in the balance among the impact resistance, the strength, the adherability and as the appearance, and a process for producing the same as well as a composition containing the same. Another objective is to provide a composition which can afford a molded body excellent in the balance among the flame retardancy, the tensile strength, the tensile extension, the heat resistance, the characteristic at low temperature, the insulation property, the pliability and the like. The hydrogenated modified polymer of the invention is a hydrogenated polymer of a modified conjugated diene-based polymer obtained by reacting an alkoxysilane compound to a polymer which is polymerized a conjugated diene or a conjugated diene and another monomer using an organic alkali metal compound as a polymerization initiator in an inert organic solvent such as cyclohexane and the like. The hydrogenated modified polymer composition of the invention contains the above-mentioned hydrogenated modified polymer and at least one selected from the group consisting of nonpolar polymer, polar polymer and filler.

21 Claims, No Drawings

HYDROGENATED MODIFIED POLYMER, PROCESS FOR PRODUCING THE SAME AND COMPOSITION CONTAINING THE SAME

BACKGROUND OF THE INVENTION

1. Field of the Invention

The present invention relates to a hydrogenated modified polymer and a process for producing the same as well as a composition containing the same. More particularly, the present invention relates to a hydrogenated modified polymer which can afford a molded body excellent in improvement in the impact resistance, the strength and the adherability as well as appearance, and a process for producing the same as well as a composition containing the same. And the present invention relates to a composition which can afford a product excellent in the balance among the flame retardancy, the tensile strength, the tensile extension, the heat resistance, the characteristic at low temperature, the insulation property, the pliability and the like, a covered material for an electric cable used in an instrument, a harness for automobile or the like, an industrial material such as an insulating tape and the like.

2. Prior Art

Although polymers have hitherto been used in many materials, since almost of them are not a single polymer in respects of the strength, the heat resistance, the impact resistance, the adherability, the cost and the like, the polymers have been used as a multicomponent polymer or a composition containing the polymer and a reinforcing agent such as a filler, and the like. For example, a hydrogenated block copolymer obtained by hydrogenation of a block copolymer consisting of conjugated diene and aromatic vinyl hydrocarbon has the comparatively high compatibility with nonpolar resins such as a polyolefin resin and a polystyrene resin, or nonpolar rubbers such as ethylene/propylene rubber and, therefore, a variety of compositions are prepared and used widely.

However, since the previous hydrogenated block copolymer has the low compatibility with polar resins such as PET, ABS, nylon and the like, in order to maintain such physical properties that can stand the use, it is necessary to introduce a polar group to the hydrogenated block copolymer. As a method of introducing such polar group, for example, there are a method of grafting a polar group-containing monomer as described in JP-B-2-62131, JP-B-3-12087 and JP-B-2-15569. Although this grafting method can add a polar group at an arbitrary amount, there are problems about treatment of an unreacted modifier, molecular cleavage of a polymer, cross-linking and the like and, furthermore, there is a problem that it is difficult to obtain the desired physical properties with the better reproductivity. In addition, an end-modifying method described in JP-B-4-39495 has a problem that the sufficient weather resistance of a molded body can not be obtained.

Because of the excellence of an olefin-based polymer (resin) in both physical and chemical characterizations, it is widely used as household articles and industrial material, for example, film, sheet, pipe, vessel, electric cable, cable and the like are produced by the way of injection molding, extrusion molding and the like. An olefin-based polymer is generally easy to burn and some methods of making it hard to burn the polymer are opened.

It is known that the most general method is to use a halogen-based flame retardant for the olefin-based polymer. Although the above-mentioned flame retardant shows a flame-retardant effect with a small amount, corrosive or noxious gas may generate when burning.

Recently there have been proposed a flame retardancy polypropylene resin composition containing no halogen-based flame retardants, for example in JP-A-2-263851. Phosphorus-based flame retardant is contained in this composition, however, it is necessary to avoid bleeding on the basis of the hygroscopic. By formulating an olefin-based synthetic rubber and a silane coupling agent, a constant improvement of avoiding bleed, it is not enough and is not always satisfied from a viewpoint of physical properties such as flexibility and pliability, pollution-free and environmental harmony.

A flame retardancy polypropylene resin composition containing propylene homopolymer, ethylene/propylene copolymer rubber, bis(2,3-dibromopropyl)ether of tetrabromobisphenol S and antimony trioxide is indicated, for example in JP-A-61-183337. In this composition bis(2,3-dibromopropyl)ether of tetrabromobisphenol S is used as a flame retardant and it has doubt of environmental hormones. It is not always satisfied from a viewpoint of environmental harmony. And since this composition contains an ethylene-propylene copolymer rubber, a constant improvement in the impact strength is observed, but in the case the composition is used for a covered material for an electric cable, it was not necessarily satisfied about the pliability demanded at the time of wiring and an assembly.

Further, a hydrate of an inorganic metal compound such as aluminum hydroxide, magnesium hydroxide and the like as a pollution-free and environmental harmony type flame retardant is recently proposed (for example in JP-A-10-279736). When a flame retardancy composition containing such hydrate of an inorganic metal compound is used, it is necessary that the content is increased in the composition, but too much content may lead to lower the mechanical property, tensile strength in particular and molding processability. For the purpose of improving this problem, a flame retardancy composition containing a styrene-based thermoplastic elastomer modified with a carboxylic acid or an acid anhydride, a metal hydroxide metal and the like but a halogen-based flame retardant is proposed (for example in JP-A-7-165997, JP-A-2000-340034). Using the styrene-based thermoplastic elastomer modified with a carboxylic acid or an acid anhydride has a problem about treatment of an unreacted modifier, molecular cleavage of a polymer, crosslinking or the like, and has a difficulty of obtaining the desired physical properties with the better reproductivity, since it is made to graft-polymerize a modifier such as maleic anhydride to a styrene-based thermoplastic elastomer in the presence of a peroxide. And using the modified styrene-based thermoplastic elastomer is effective for progress in affinity between the elastomer and an inorganic flame retardant, improvement in the tensile extension, the heat resistance, the characteristic at low temperature and the pliability is not enough because of a little entanglement with an olefin-based polymer and a little interface reinforcing effect between the olefin-based polymer and an inorganic-based flame retardant.

SUMMARY OF THE INVENTION

The present invention was done in view of the above-mentioned circumstance, and an object of the present invention is to provide a hydrogenated modified polymer which can afford a molded body excellent in improvement in the balance among the impact resistance, the strength, the adherability and as the appearance, and a process for producing the same as well as a composition containing the same. Another objective is to provide a composition which can afford a product excellent in the balance among the flame retardancy, the tensile strength, the tensile extension, the heat resistance, the characteristic at low temperature, the insulation property, the pliability and the like, a covered material for an electric cable used in an instrument, a harness for automobile or the like, an industrial material such as an insulating tape and the like.

The present inventors intensively studied in order to attain the above-mentioned object. As a result, we found that a hydrogenated modified polymer excellent in improvement in the impact resistance, the strength, the adherability and the appearance of a molded body can be obtained and completed the present invention. That is, a monomer is polymerized using a catalyst to a living polymer, the living polymer is reacted with a compound having a protected polar group such as an amino group, an epoxy group, an alkoxysilyl group and the like to a modified polymer in order to introduce a polar group having the interacting activity with a polar resin or a filler, and the modified polymer is hydrogenated to the resulting modified polymer.

The present invention is described as follows.

1. A hydrogenated modified polymer obtained by hydrogenating a modified polymer having at least one primary amino group and/or at least one secondary amino group in a conjugated diene-based polymer obtained by anion-polymerizing a conjugated diene or a conjugated diene and another monomer.

2. The hydrogenated modified polymer according to 1 above, wherein the above-mentioned modified polymer is obtained by anion-polymerization using at least one selected from the group consisting of polymerization initiators represented by the following general formulas (1) and (2), and a hydrogenated modified polymer is obtained by removing a protecting group bound to the above-mentioned modified polymer during the hydrogenation and/or after the hydrogenation.

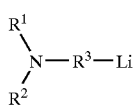

(1)

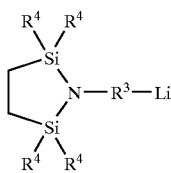

(2)

[In the general formula (1), both $R^1$ and $R^2$ are a trialkylsilyl group having a carbon number of 3 to 18, or one of them is the trialkylsilyl group and the other is an alkyl group having a carbon number of 1 to 20, an aryl group having a carbon number of 6 to 20, an aralkyl group having a carbon number of 7 to 20 or an organosiloxy group having a carbon number of 1 to 100. And, $R^3$ in the general formulas (1) and (2) is an alkylene group having a carbon number of 1 to 20 or an alkylidene group having a carbon number of 1 to 20. Further, $R^4$ in the general formula (2) is an alkyl group having a carbon number of 1 to 20, an aryl group having a carbon number of 6 to 20, an aralkyl group having a carbon number of 7 to 20 or an organosiloxy group having a carbon number of 1 to 100].

3. The hydrogenated modified polymer according to 1 above, wherein the above-mentioned modified polymer is obtained by anion-polymerizing at least one selected from the group consisting of unsaturated monomers represented by the following general formulas (3) and (4), and a hydrogenated modified polymer is obtained by removing a protecting group bound to the above-mentioned modified polymer during the hydrogenation and/or after the hydrogenation.

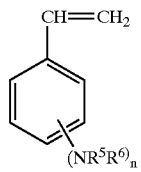

(3)

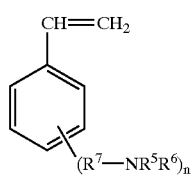

(4)

[In the general formulas (3) and (4), both $R^5$ and $R^6$ are a trialkylsilyl group having a carbon number of 3 to 18, or one of them is the trialkylsilyl group and the other is an alkyl group having a carbon number of 1 to 20, an aryl group having a carbon number of 6 to 20, aralkyl group having a carbon number of 7 to 20 or an organosiloxy group having a carbon number of 1 to 100. And $R^7$ in the general formula (4) is an alkylene group having a carbon number of 1 to 20 or an alkylidene group having a carbon number of 1 to 20. Further, n in the general formulas (3) and (4) is 1 to 3].

4. The hydrogenated modified polymer according to 1 above, wherein the above-mentioned modified polymer is obtained by reacting a polymerization terminator represented by the following general formula (5) to an active point of the above-mentioned conjugated diene-based polymer.

$$R^8R^9C=N-Y \qquad (5)$$

[In the general formula (5), $R^8$ and $R^9$ are respectively a hydrogen atom, an alkyl group having a carbon number of 1 to 20, an aryl group having a carbon number of 6 to 20, an aralkyl group having a carbon number of 7 to 20 or an organosiloxy group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number of 7 to 20 or an organosiloxy group having a carbon number of 1 to 100].

5. The hydrogenated modified polymer according to 1 above, wherein above-mentioned conjugated diene-based polymer is a block copolymer containing 2 or more polymer blocks selected from the group consisting of (A) to (E) polymer blocks.

(A) an aromatic vinyl compound polymer block in which an aromatic vinyl compound is 80 wt % or more
(B) a conjugated diene polymer block in which conjugated diene is 80 wt % or more
(C) a conjugated diene polymer block in which a total of a 1,2-bond content and a 3,4-bond content is less than 25 wt %

(D) a conjugated diene polymer block in which a total of a 1,2-bond content and a 3,4-bond content is 25 wt % or more and not more than 90 wt %
(E) a random copolymer block of an aromatic vinyl compound and a conjugated diene.

6. A hydrogenated modified polymer obtained by polymerizing a conjugated diene or a conjugated diene and another monomer using an organic alkali metal compound as a polymerization initiator, adding an alkoxysilane compound to the resulting conjugated diene-based polymer to terminate the reaction to obtain a modified polymer, which is hydrogenated.

7. The hydrogenated modified polymer according to 6 above, wherein the above-mentioned alkoxysilane compound is a compound represented by the following general formula (6), and if a protecting group is in the above-mentioned modified polymer, a hydrogenated modified polymer is obtained by removing a protecting group bound to the above-mentioned modified polymer during the hydrogenation and/or after the hydrogenation.

[In the general formula (6), $R^{10}$ is an alkyl group having a carbon number of 1 to 20, an aryl group having a carbon number of 6 to 20, an aralkyl group having a carbon number of 7 to 20 or an organosiloxy group having a carbon number of 1 to 100 and, when there are a plurality of $R^{10}$s, respective $R^{10}$s may be the same or different. And $R^{11}$ is an alkyl group having a carbon number of 1 to 20, an aryl group having a carbon number of 6 to 20 or an aralkyl group having a carbon number of 7 to 20 and, when there are a plurality of $R^{11}$s, respective $R^{11}$s may be the same or different. X is a substituent (provided that $OR^{11}$ is excluded) having a polar group containing at least one selected from the group consisting of a N atom, an O atom and a Si atom and, when there are a plurality of Xs, respective Xs may be the same or different, or respective Xs may be an independent substituent or form a cyclic structure. m is 1, 2, 3 or 4, and n is 0, 1, 2 or 3. The sum of m and n is 1 to 4].

8. The hydrogenated modified polymer according to 6 above, wherein above-mentioned conjugated diene-based polymer is a block copolymer containing 2 or more polymer blocks selected from the group consisting of (A) to (E) polymer blocks.

(A) an aromatic vinyl compound polymer block in which an aromatic vinyl compound is 80 wt % or more
(B) a conjugated diene polymer block in which conjugated diene is 80 wt % or more
(C) a conjugated diene polymer block in which a total of a 1,2-bond content and a 3,4-bond content is less than 25 wt %
(D) a conjugated diene polymer block in which a total of a 1,2-bond content and a 3,4-bond content is 25 wt % or more and not more than 90 wt %
(E) a random copolymer block of an aromatic vinyl compound and a conjugated diene.

9. A process for producing a hydrogenated modified polymer characterized in hydrogenating a modified polymer having an primary amino group and/or a secondary amino group in a conjugated diene-based polymer, obtained by anion-polymerizing a conjugated diene or a conjugated diene and another monomer.

10. The process for producing a hydrogenated modified polymer according to 9 above, wherein introduction of the above-mentioned primary amino group and/or the above-mentioned secondary amino group is performed using a polymerization initiator having an amino group.

11. The process for producing a hydrogenated modified polymer according to 10 above, wherein the above-mentioned polymerization initiator having an amino group is a polymerization initiator having an amino group in which a protecting group is bound to a nitrogen atom, and the above-mentioned protecting group in the above-mentioned modified polymer is removed during the hydrogenation and/or after the hydrogenation.

12. The process for producing a hydrogenated modified polymer according to 9 above, wherein the above-mentioned polymerization initiator having an amino group in which a protecting group is bound to a nitrogen atom is at least one selected from the group consisting of compounds represented by the following general formulas (7) and (8).

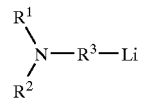

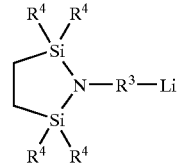

[In the general formula (7), both $R^1$ and $R^2$ are a trialkylsilyl group having a carbon number of 3 to 18, or one of them is the trialkylsilyl group and the other is an alkyl group having a carbon number of 1 to 20, an aryl group having a carbon number of 6 to 20, an aralkyl group having a carbon number of 7 to 20 or an organosiloxy group having a carbon number of 1 to 100. And, $R^3$ in the general formulas (7) and (8) is an alkylene group having a carbon number of 1 to 20 or an alkylidene group having a carbon number of 1 to 20. Further, $R^4$ in the general formula (8) is an alkyl group having a carbon number of 1 to 20, an aryl group having a carbon number of 6 to 20, an aralkyl group having a carbon number of 7 to 20 or an organosiloxy group having a carbon number of 1 to 100].

13. The process for producing a hydrogenated modified polymer according to 9 above, wherein introduction of the above-mentioned primary amino group and/or the above-mentioned secondary amino group is carried out by performing the above-mentioned anion polymerization of an unsaturated monomer having an amino group in which a protecting group is bound to a nitrogen atom, and the above-mentioned protecting group in the above-mentioned modified polymer is removed during the hydrogenation and/or after the hydrogenation.

14. The process for producing a hydrogenated modified polymer according to 13 above, wherein the above-mentioned unsaturated monomer having an amino group in which a protecting group is bound to a nitrogen atom is at least one selected from the group consisting of compounds represented by the following general formulas (9) and (10).

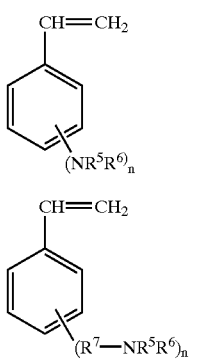

[In the general formulas (9) and (10), both $R^5$ and $R^6$ are a trialkylsilyl group having a carbon number of 3 to 18, or one of them is the trialkylsilyl group and the other is an alkyl group having a carbon number of 1 to 20, an aryl group having a carbon number of 6 to 20, aralkyl group having a carbon number of 7 to 20 or an organosiloxy group having a carbon number of 1 to 100. And $R^7$ in the general formula (10) is an alkylene group having a carbon number of 1 to 20 or an alkylidene group having a carbon number of 1 to 20. Further, n in the general formulas (9) and (10) is 1 to 3].

15. The process for producing a hydrogenated modified polymer according to 9 above, wherein introduction of the above-mentioned primary amino group and/or the above-mentioned secondary amino group is carried out by reacting a polymerization terminator represented by the following general formula (11) to an active point of the above-mentioned conjugated diene-based polymer.

[In the general formula (11), $R^8$ and $R^9$ are respectively a hydrogen atom, an alkyl group having a carbon number of 1 to 20, an aryl group having a carbon number of 6 to 20, an aralkyl group having a carbon number of 7 to 20 or an organosiloxy group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number of 7 to 20 or an organosiloxy group having a carbon number of 1 to 100].

16. A process for producing a hydrogenated modified polymer comprising:
a first step for polymerizing a conjugated diene or a conjugated diene and another monomer in an inert organic solvent using an organic alkali metal compound as a polymerization initiator,
a second step for terminating reaction by adding an alkoxysilane compound to the resulting conjugated diene-based polymer, and
a third step for hydrogenating the resulting modified polymer.

17. The process for producing a hydrogenated modified polymer according to 16 above, wherein the above-mentioned alkoxysilane compound is a compound represented by the following general formula (12), and if a protecting group is in the above-mentioned modified polymer, the above-mentioned protecting group is removed during the hydrogenation and/or after the hydrogenation.

[In the general formula (12), $R^{10}$ is an alkyl group having a carbon number of 1 to 20, an aryl group having a carbon number of 6 to 20, an aralkyl group having a carbon number of 7 to 20 or an organosiloxy group having a carbon number of 1 to 100 and, when there are a plurality of $R^{10}$s, respective $R^{10}$s may be the same or different. And $R^{11}$ is an alkyl group having a carbon number of 1 to 20, an aryl group having a carbon number of 6 to 20 or an aralkyl group having a carbon number of 7 to 20 and, when there are a plurality of $R^{11}$s, respective $R^{11}$s may be the same or different. X is a substituent (provided that $OR^{11}$ is excluded) having a polar group containing at least one selected from the group consisting of a N atom, an O atom and a Si atom and, when there are a plurality of Xs, respective Xs may be the same or different, or respective Xs may be an independent substituent or form a cyclic structure. m is 1, 2, 3 or 4, and n is 0, 1, 2 or 3. The sum of m and n is 1 to 4].

18. A hydrogenated modified polymer composition comprising the hydrogenated modified polymer as defined in 1 above, and at least one selected from the group consisting of nonpolar polymer, polar polymer and filler.

19. The hydrogenated modified polymer composition according to 18 above, wherein the above-mentioned nonpolar polymer is at least one selected from the group consisting of polyolefin-based polymer and aromatic vinyl-based polymer, and the above-mentioned polar polymer is a polymer having at least one selected from the group consisting of carboxyl group (containing an acid anhydride and a carboxylic acid metal salt), hydroxyl group, halogen group, epoxy group, oxazolin group, sulfonic acid group, isocyanate group, thiol group, ester bond, carbonate bond, amide bond, ether bond, urethane bond and urea bond.

20. A hydrogenated modified polymer composition comprising the hydrogenated modified polymer as defined in 6 above, and at least one selected from the group consisting of nonpolar polymer, polar polymer and filler.

21. The hydrogenated modified polymer composition according to 20 above, wherein the above-mentioned nonpolar polymer is at least one selected from the group consisting of polyolefin-based polymer and aromatic vinyl-based polymer, and the above-mentioned polar polymer is a polymer having at least one selected from the group consisting of carboxyl group (containing an acid anhydride and a carboxylic acid metal salt), hydroxyl group, halogen group, epoxy group, oxazolin group, sulfonic acid group, isocyanate group, thiol group, ester bond, carbonate bond, amide bond, ether bond, urethane bond and urea bond.

The hydrogenated modified polymer of the present invention is excellent in the polar resin modifying effects and the compatibilizing effects of the previous heterogenous polymer mixture. Therefore, the hydrogenated modified polymer of the invention can be converted into a better material which can afford a molded body showing excellent balance in the rigidity, the heat resistance, the impact resistance, the falling weight impact strength, the tensile breaking extension, the image clarity and peeling between layers, by preparing into a polymer composition containing another polymer and the like. In addition, according to a process for producing the hydrogenated modified polymer of the present invention, a hydrogenated modified polymer having the above-mentioned useful effects can be produced.

According to the hydrogenated modified polymer composition of the present invention, it is produced by the above-mentioned hydrogenated modified polymer and at least one component selected from the group consisting of nonpolar polymer, polar polymer and filler are homogeneously mixed containing an additive added as necessary, and can afford a molded body excellent in the rigidity, the heat resistance, the impact resistance, the falling weight impact strength, the tensile breaking extension, the image clarity and the balance in peeling between layers.

Therefore, the hydrogenated modified polymer of the present invention and the composition containing the same can be widely utilized in the fields of various industrial parts such as food packaging containers, various trays, sheets, tubes, films, fibers, laminates, coatings, boxes for OA equipments and appliances such as electric and electronic parts of printed boards, computer and the like, automobiles' internal and external trim materials, outer ply parts, precise parts, building material and the like. In addition, in these utilization fields, when a polymer composition containing the hydrogenated modified polymer of the present invention is expanded, it can be preferably used.

And according to another hydrogenated modified polymer composition, it can afford a covered material for an electric cable used in an instrument, a harness for automobile or the like, an industrial material such as an insulating tape and the like which are excellent in the balance among the tensile strength, the tensile extension, the heat resistance, the characteristic at low temperature, the insulation property, the pliability and the like as well as in flame retardancy, without generation of the noxious gas such as halogen gas and further without containing environmental pollution substances such as phosphorus and lead.

DETAILED DESCRIPTION OF THE INVENTION

The present invention will be explained in detail below.

The modified polymer according to the first aspect of the invention is a polymer modified by introducing at least one primary amino group and/or at least one secondary amino group in a conjugated diene-based polymer obtained by anion-polymerizing a conjugated diene or a conjugated diene and another monomer. The hydrogenated modified polymer of the first aspect is preferable because it can improve the polar resin modifying effects and the compatibilizing effects of a heterogenous polymer mixture.

Here, the above-mentioned "modified by introducing at least one primary amino group and/or at least one secondary amino group in a conjugated diene-based polymer" includes introduction of at least one primary amino group and/or at least one secondary amino group in the produced conjugated diene-based polymer, and proceeding of anion polymerization while introducing at least one primary amino group and/or at least one secondary amino group. The above-mentioned modified polymer has not limited structures as long as it has the above-mentioned construction. For example, both of a position and a number of the primary amino group and/or the secondary amino group in the above-mentioned modified polymer are not particularly limited but may be positioned at an end or may be positioned at a place other than the end.

The above-mentioned conjugated diene is not particularly limited and includes 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, chloroprene and the like. Among these, 1,3-butadiene and isoprene are preferable since they have the high polymerization reactivity and are industrially more available. In addition, these may be used alone or in combination of two or more.

A monomer to be polymerized may be the conjugated diene alone. Alternatively, the conjugated diene may be polymerized with another monomer. For example, the conjugated diene and an aromatic vinyl compound may be polymerized. The aromatic vinyl compound includes styrene, tert-butylstyrene, α-methylstyrene, p-methylstyrene, p-ethylstyrene, divinylbenzene, 1,1-diphenylstyrene, 1-vinylnaphthalene, 2-vinylnaphthalene, 2-vinylanthracene, 9-vinylanthracene, p-vinylbenzyl propyl ether, p-vinylbenzyl butyl ether, p-vinylbenzyl hexyl ether, p-vinylbenzyl pentyl ether, m-N,N-diethylaminoethylstyrene, p-N,N-diethylaminoethylstyrene, p-N,N-dimethylaminoethylstyrene, o-vinylbenzyldimethylamine, p-vinylbenzyldimethylamine, p-vinylbenzyldiethylamine, p-vinylbenzyldi(n-propyl)amine, p-vinylbenzyldi(n-butyl)amine, vinylpyridine, 2-vinylbiphenyl, 4-vinylbiphenyl and the like. Among these, styrene and tertbutylstyrene are preferable since they have the high polymerization reactivity, are industrially more available and the resulting hydrogenated modified polymer has the better processibility. In addition, these may be used alone or in combination of two or more. In this case, the conjugated diene and the aromatic vinyl compound, and a further monomer may be polymerized.

A method of introducing the primary amino group and/or the secondary amino group in the conjugated diene-based polymer is not particularly limited. Examples of the method include (1) a method of introduction by performing anion polymerization using a polymerization initiator having an amino group, (2) a method of introduction by reacting an unsaturated monomer having an amino group and a conjugated diene or the like, (3) a method of introduction by reacting a polymerization terminator having an amino group to an active point of the conjugated diene-based polymer, and the like.

The polymerization initiator having an amino group is not particularly limited and is preferably an organic alkali metal compound having an amino group. Examples of the alkali metal include lithium, sodium, potassium and the like. In addition, as the polymerization initiator having the amino group, a polymerization initiator having the amino group in which a protecting group is bound to the nitrogen atom may be used. Here, the above-mentioned "protecting group" is the one that makes a polar group inactivated derivative and attains a target reaction in the case the polar group interferes a polymerization reaction or polar group-introduction reaction considered as a request. Possession of such protecting group makes anion polymerization easier as compared with no protecting group and anion polymerization occurs in a living manner. Examples of the protecting group include a trimethylsilyl group, a triethylsilyl group, a t-butyldimethylsilyl group, a di-t-butylmethylsilyl group and the like as the protecting group of a primary amino group and a secondary amino group, a trimethylsilyl group, a triethylsilyl group, a t-butyldimethylsilyl group, a di-t-butylmethylsilyl group, a benzyl group, a methoxymethyl group, an isopropylideneacetal group and the like as the protecting group of an alcohol. The polymerization initiator having an amino group in which a protecting group is bound to a nitrogen atom includes an organic alkali metal compound having an amino group in which a protecting group is bound to the nitrogen atom, more specifically, compounds represented by the general formulas (1) and (2) [formulas (7) and (8)]. The use of at least one of the compounds represented by the general formulas (1) and (2) [formulas (7) and (8)] is preferable since industrially practicable anion polymerization can be effectively performed. The above-mentioned polymerization initiator having an amino group may be used alone or in combination of two or more.

In the general formula (1) [formula (7)], both $R^1$ and $R^2$ are a trialkylsilyl group having a carbon number of 3 to 18

(preferably 3 to 9, more preferably 3 to 6), or one of them is the above-mentioned trialkylsilyl group and the other is an alkyl group having a carbon number of 1 to 20 (preferably 1 to 18, more preferably 1 to 6), an aryl group having a carbon number of 6 to 20 (preferably 6 to 12, more preferably 6 to 9), an aralkyl group having a carbon number of 7 to 20 (preferably 7 to 13, more preferably 7 to 10), or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group. In addition, $R^3$ in the general formulas (1) and (2) [formulas (7) and (8)] is an alkylene group having a carbon number of 1 to 20 (preferably 1 to 10, more preferably 1 to 6) or an alkylidene group having a carbon number of 1 to 20 (preferably 1 to 10, more preferably 1 to 6). Further, $R^4$ in the general formula (2) [formula (8)] is an alkylene group having a carbon number of 1 to 20 (preferably 1 to 10, more preferably 1 to 6), an aryl group having a carbon number of 6 to 20 (preferably 6 to 12, more preferably 6 to 9), an aralkyl group having a carbon number of 7 to 20 (preferably 7 to 13, more preferably 7 to 10), or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group. $R^1$ and $R^2$ in the general formula (1) [formula (7)] and each $R^4$ in the general formula (2) [formula (8)] may be the same or different.

Examples of the polymerization initiator represented by the general formulas (1) and (2) [formulas (7) and (8)] are as follows:

① Compounds which are converted into primary amine when a protecting group is removed by hydrolysis;

3-lithio-1-[N,N-bis(trimethylsilyl)]aminopropane (CAS No.289719-98-8), 2-lithio-1-[N,N-bis(trimethylsilyl)] aminoethane, 3-lithio-2,2-dimethyl-1-[N,N-bis (trimethylsilyl)]aminopropane, 2,2,5,5-tetramethyl-1-(3-lithiopropyl)-1-aza-2,5-disilacyclopentane, 2,2,5,5-tetramethyl-1-(3-lithio-2,2-dimethyl-propyl)-1-aza-2,5-disilacyclopentane, 2,2,5,5-tetramethyl-1-(2-lithioethyl)-1-aza-2,5-disilacyclopentane, 3-lithio-1-[N-(tert-butyl-dimethylsilyl)-N-trimethylsilyl]aminopropane, 3-lithio-1-[N-{di(tert-butyl)-methylsilyl}-N-trimethylsilyl] aminopropane, 3-lithio-1-[N-(tert-butyl-dimethylsilyl)-N-trimethylsilyl]aminoethane, 3-lithio-1-[N-{di(tert-butyl)-methylsilyl}-N-trimethylsilyl]aminoethane, 3-lithio-2,2-dimethyl-1-[N-(tert-butyl-dimethylsilyl)-N-trimethylsilyl] aminopropane, 3-lithio-2,2-dimethyl-1-[N-{di(tert-butyl)-methylsilyl}-N-trimethylsilyl}aminopropane and the like.

② Compounds which are converted into secondary amine when a protecting group is removed by hydrolysis;

3-lithio-1-(N-methyl-N-trimethylsilyl)aminopropane, 3-lithio-1-(N-ethyl-N-trimethylsilyl)aminopropane, 2-lithio-1-(N-methyl-N-trimethylsilyl)aminoethane, 2-lithio-1-(N-ethyl-N-trimethylsilyl)aminoethane, 3-lithio-1-[N-methyl-N-(tert-butyl-dimethylsilyl)]aminopropane, 3-lithio-1-[N-methyl-N-{di(tert-butyl)-methylsilyl}] aminopropane, 3-lithio-1-[N-ethyl-N-(tert-butyl-dimethylsilyl)]aminopropane, 3-lithio-1-[N-ethyl-N-{di (tert-butyl)-methylsilyl}]aminopropane, 3-lithio-1-[N-methyl-N-(tert-butyl-dimethylsilyl)]aminoethane, 3-lithio-1-[N-methyl-N-{di(tert-butyl)-methylsilyl}]aminoethane, 3-lithio-1-[N-ethyl-N-(tert-butyl-dimethylsilyl)] aminoethane. 3-lithio-1-[N-ethyl-N-{di(tert-butyl)-methylsilyl}]aminoethane and the like.

Alternatively, the above-mentioned unsaturated monomer having an amino group in which a protecting group is bound to the nitrogen atom may be an unsaturated compound having an amino group which is converted into a primary amino group and/or a secondary amino group by removing a protecting group later. The effect of the protecting group is as described above. Here, the above-mentioned unsaturated monomer having an amino group may be used at least one of compounds represented by the general formulas (3) and (4) [formulas (9) and (10)]. Embodiments thereof include an aromatic vinyl compound having an amino group to which a protecting group is bound, bis(trimethylsilyl)aminomethyl (meth)acrylate having an amino group to which a protecting group is bound, bis(trimethylsilyl)aminoethyl (meth) acrylate having an amino group to which a protecting group is bound and the like. An unsaturated monomer except the compounds described below may be used. The above-mentioned unsaturated monomer having an amino group in which a protecting group is bound to a nitrogen atom may be used alone or in combination of two or more.

In the general formulas (3) and (4) [formulas (9) and (10)], both $R^5$ and $R^6$ are a trialkylsilyl group having a carbon number of 3 to 18 (preferably 3 to 9, more preferably 3 to 6), or one of them is the trialkylsilyl group and the other is alkyl group having a carbon number of 1 to 20 (preferably 1 to 18, more preferably 1 to 6), an aryl group having a carbon number of 6 to 20 (preferably 6 to 12, more preferably 6 to 9), an aralkyl group having a carbon number of 7 to 20 (preferably 7 to 13, more preferably 7 to 10), or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group. In addition, in the general formula (4) [formula (10)], $R^7$ is an alkylene group having a carbon number of 1 to 20 (preferably 1 to 18, more preferably 1 to 6) or an alkylidene group having a carbon number of 1 to 20 (preferably 1 to 18, more preferably 1 to 6). The $R^5$ and $R^6$ may be the same or different. In addition, n denoting the number of amino groups in the general formulas (3) and (4) [formulas (9) and (10)] is usually 1 to 3, preferably 1 to 2. Further, places on a benzene ring of the general formula (3) [formula (9)] which are not substituted with a vinyl group or a —$NR^5R^6$ group, may be not substituted or may be substituted with other functional groups. Similarly, places on a benzene ring of the general formula (4) [formula (10)] which are not substituted with a vinyl group or a —$R^7$—$NR^5R^6$ group, may not be substituted or may be substituted with other functional groups.

Examples of the unsaturated monomer represented by the general formulas (3) and (4) [formulas (9) and (10)] are shown below:

① Compounds which are converted into primary amine when a protecting group is removed by hydrolysis;

p-[N,N-bis(trimethylsilyl)amino]styrene, p-[N,N-bis(trimethylsilyl)aminomethyl]styrene, p-{2-[N,N-bis(trimethylsilyl)amino]ethyl}styrene, m-[N,N-bis(trimethylsilyl)amino]styrene, m-[N,N-bis(trimethylsilyl)aminomethyl]styrene, m-[2-{N,N-bis(trimethylsilyl)amino}ethyl]styrene, o-[N,N-bis(trimethylsilyl)amino] styrene, o-[N.N-bis(trimethylsilyl)aminomethyl]styrene, o-[2-{N,N-bis(trimethylsilyl)amino}ethyl]styrene, p-[N-(tert-butyl-dimethylsilyl)-N-trimethylsilylamino]styrene, p-[N-(tert-butyl-dimethylsilyl)-N-trimethylsilylaminomethyl]styrene, p-[2-{N-(tert-butyl-dimethylsilyl)-N-trimethylsilylamino}ethyl]styrene, p-[N-{di(tert-butyl)-methylsilyl}-N-trimethylsilylamino]styrene, p-[N-{di(tert-butyl)-methylsilyl}-N-trimethylsilylaminomethyl]styrene, p-2-[N-{di(tert-butyl)-methylsilyl}-N-trimethylsilylamino]

ethylstyrene, o-[N-(tert-butyl-dimethylsilyl)-N-trimethylsilylamino]styrene, o-[N-(tert-butyl-dimethylsilyl)-N-trimethylsilylaminomethyl]styrene, o-[2-{N-(tert-butyl-dimethylsilyl)-N-trimethylsilylamino}ethyl]styrene, o-[N-{di(tert-butyl)-methylsilyl}-N-trimethylsilylamino]styrene, o-[N-{di(tert-butyl)-methylsilyl}-N-trimethylsilylaminomethyl]styrene, o-2-[N-{di(tert-butyl)-methylsilyl}-N-trimethylsilylamino]ethylstyrene, m-[N-(tert-butyl-dimethylsilyl)]-N-trimethylsilylamino]styrene, m-[N-(tert-butyl-dimethylsilyl)-N-trimethylsilylaminomethyl]styrene, m-[2-{N-(tert-butyl-dimethylsilyl)-N-trimethylsilylamino}ethyl]styrene, m-[N-{di(tert-butyl)-methylsilyl}-N-trimethylsilylamino}styrene, m-[N-{di(tert-butyl)-methylsilyl}-N-trimethylsilylaminomethyl]styrene, m-2-[N-{di(tert-butyl)-methylsilyl}-N-trimethylsilylamino]ethylstyrene and the like.

② Compounds which are converted into secondary amine when a protecting group is removed by hydrolysis;

p-(N-methyl-N-trimethylsilylamino)styrene, p-(N-methyl-N-trimethylsilylaminomethyl)styrene, p-[2-(N-methyl-N-trimethylsilylamino)ethyl]styrene, m-(N-methyl-N-trimethylsilylamino)styrene, m-(N-methyl-N-trimethylsilylaminomethyl)styrene, m-[2-(N-methyl-N-trimethylsilylamino)ethyl]styrene, o-(N-methyl-N-trimethylsilylamino)styrene, o-(N-methyl-N-trimethylsilylaminomethyl)styrene, o-[2-(N-methyl-N-trimethylsilylamino)ethyl]styrene, p-[N-(tert-butyl-dimethylsilyl)-N-methylamino]styrene, p-[{N-(tert-butyl-dimethylsilyl)-N-methylamino}methyl]styrene, p-[2-{N-(tert-butyl-dimethylsilyl)-N-methylamino}ethyl]styrene, p-[{N-di(tert-butyl)-methylsilyl-N-methyl}amino]styrene, p-[{N-di(tert-butyl)-methylsilyl-N-methyl}aminomethyl]styrene, p-[{N-di(tert-butyl)-methylsilyl-N-methyl}aminoethyl]styrene, o-[N-(tert-butyl-dimethylsilyl)-N-methylamino]styrene, o-[{N-(tert-butyl-dimethylsilyl)-N-methylamino}methyl]styrene, o-[2-{N-(tert-butyl-dimethylsilyl)-N-methylamino}ethyl]styrene, o-[{N-di(tert-butyl)-methylsilyl-N-methyl}amino]styrene, o-[{N-di(tert-butyl)-methylsilyl-N-methyl}aminomethyl]styrene, o-[{N-di(tert-butyl)-methylsilyl-N-methyl}aminoethyl]styrene, m-[N-(tert-butyl-dimethylsilyl)-N-methylamino]styrene, m-[{N-(tert-butyl-dimethylsilyl)-N-methylamino}methyl]styrene, m-[2-{N-(tert-butyl-dimethylsilyl)-N-methylamino}ethyl]styrene, m-[{N-di(tert-butyl)-methylsilyl-N-methyl}amino]styrene, m-[{N-di(tert-butyl)-methylsilyl-N-methyl}aminomethyl]styrene, m-[(N-di(tert-butyl)-methylsilyl-N-methyl}aminoethyl]styrene and the like.

The unsaturated monomer having an amino group in which a protecting group is bound to the nitrogen atom may be reacted under the low temperature conditions at −10° C. or lower, whereby, a side reaction hardly occurs and polymerization may be repeated in a living manner. However, polymerization under the low temperature conditions at −10° C. or lower is not industrially preferable. Then, when the unsaturated monomer having an amino group in which a protecting group is bound to the nitrogen atom is added to react an active point derived from an organic alkali metal under the conditions at −10° C. or higher, at a ratio of 0.01 to 100-fold mole, preferably 0.01 to 10-fold mole, particularly preferably 1.0 to 3.0-fold mole relative to mole of active points, it is preferable in that a side reaction hardly occurs. Since a side reaction occurs when a reaction time is too long, a reaction is preferably performed in a range of 1 second to 2 hours. Further, the unsaturated monomer having an amino group in which a protecting group is bound to the nitrogen atom may be added at an arbitrary time point such as at initiation of polymerization, during polymerization, after completion of polymerization and the like.

Furthermore, by reacting a polymerization terminator represented by the general formula (5) [formula (11)] with the above-mentioned conjugated diene-based polymer, polymerization can be terminated and a primary amino group and/or a secondary amino group can be introduced in the above-mentioned conjugated diene-based polymer. The polymerization terminator represented by general formula (5) [formula (11)] may be used alone or in combination of two or more. In addition, the polymerization terminator represented by the general formula (5) [formula (11)] may be used as a solid or a liquid, or may be used as a solution dissolved in polymerization solvent.

In the general formula (5) [formula (11)], $R^8$ and $R^9$ are a hydrogen atom, an alkyl group having a carbon number of 1 to 20 (preferably 1 to 18, more preferably 1 to 6), an aryl group having a carbon number of 6 to 20 (preferably 6 to 12, more preferably 6 to 9), an aralkyl group having a carbon number of 7 to 20 (preferably 7 to 13, more preferably 7 to 10), or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group independently, respectively. In addition, Y is a hydrogen atom, a trialkylsilyl group having a carbon number of 3 to 18 (preferably 3 to 9, more preferably 3 to 6), an alkyl group having a carbon number of 1 to 20 (preferably 1 to 18, more preferably 1 to 6), an aryl group having a carbon number of 6 to 20 (preferably 6 to 12, more preferably 6 to 9), an aralkyl group having a carbon number of 7 to 20 (preferably 9 to 13, more preferably 7 to 10), or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group. As the polymerization terminator represented by general formula (5) [formula (11)], those compound in which any one of $R^8$ and $R^9$ is a hydrogen atom are preferable. $R^8$ and $R^9$ may be the same or different.

When the polymerization terminator represented by the general formula (5) [formula (11)] is reacted with the above-mentioned conjugated diene-based polymer, 20% or more, preferably 30% or more, more preferably 40% or more of active points of the above-mentioned conjugated diene-based polymer may be modified. Thereby, materials which are particularly excellent in the affinity with a polar resin and a filler contained in a hydrogenated polymer composition can be obtained. An amount of the polymerization terminator to be used is not particularly limited but is usually 0.2 to 3-fold mole, preferably 0.3 to 1.5-fold mole, more preferably 0.4 to 1.3-fold mole, particularly preferably 1.0 to 1.3-fold mole relative to mole of the active point. Further, when the above-mentioned polymerization terminator is used, a reaction temperature is usually in the range of 50 to 100° C., and a reaction time is usually in a range of 1 minute to 2 hours.

Examples of the polymerization terminator represented by the general formula (5) [formula (11)] include N-benzylidenemethylamine, N-benzylideneethylamine, N-benzylidenebutylamine, N-benzylideneaniline, n-benzylidenebenzylamine, N-benzylidenetoluidine, N-(α-phenylbenzylidene)benzylamine, N-(α-phenylbenzylidene)amine, N-butylidenebenzenesulfenamide, N-isopropylidenebenzenesulfenamide, N-benzylidenebenzenesulfenamide, N-(α-phenylbenzylidene) benzenesulfenamide, N-trimethylsilylbenzaldoimine, N-triphenylsilylbenzaldoimine, N-trimethylsilyl(1-phenylpentylidene)amine, N-trimethylsilylethylideneamine, N-(tert-butyl-dimethyl)silyl(1-phenylpentylidene)amine, N-(tert-butyl-dimethyl)silylethylideneamine, N-[di(tert-butyl)-metyl]silyl(1-phenylpentylidene)amine, N-[di(tert-butyl)-methyl]silylethylideneamine and the like.

For the purpose of preparing a modified polymer by polymerizing an unsaturated monomer having an amino group in which a protecting group is bound to the nitrogen atom, another polymerization initiator except the above-mentioned polymerization initiator can be used. And the other polymerization initiator can be used with the above-mentioned polymerization initiator having an amino group in which a protecting group is bound to the nitrogen atom. As the other polymerization initiator, an organic alkali metal compound is preferred. Examples of the organic alkali metal compound include an organic lithium compound, an organic sodium compound and the like. In particular, an organic lithium compound is preferable. As the organic lithium compound, for example, an organic monolithium compound, an organic dilithium compound and an organic polylithium compound are used.

Examples of the organic lithium compound include ethyllithium, n-propyllithium, iso-propyllithium, n-butyllithium, sec-butyllithium, tert-butyllithium, pentyllithium, hexyllithium, cyclohexyllithium, phenyllithium, hexamethylenedilithium, cyclopentadienyllithium, indenyllithium, 1,1-diphenyl-n-hexyllithium, 1,1-diphenyl-3-methylpentyllithium, lithiumnaphthalene, butadienyldilithium, isopropenyldilithium, m-diisopropenyldilithium, 1,3-phenylene-bis-(3-methyl-1-phenylpentylidene)bislithium, 1,3-phenylene-bis-(3-methyl-1,[4-methylphenyl]pentylidene)bislithium, 1,3-phenylene-bis-(3-methyl-i,[4-dodecylphenyl]pentylidene)bislithium, 1,1,4,4-tetraphenyl-1,4-dilithiobutane, polybutadienyllithium, polyisoprenyllithium, polystyrene-butadienyllithium, polystyrenyllithium, polyethylenyllithium, poly-1,3-cyclohexadienyllithium, polystyrene-1,3-cyclohexadienyllithium, polybutadiene-1,3-cyclohexadienyllithium and the like.

Among these, ethyllithium, n-propyllithium, iso-propyllithium, n-butyllithium, sec-butyllithium, tert-butyllithium, cyclohexyllithium, butadienyllithium, isopropenyldilithium, 1,3-phenylene-bis-(3-methyl-1-phenylpentylidene)bislithium, 1,3-phenylene-bis-(3-methyl-1,[4-methylphenyl]pentylidene)bislithium, 1,3-phenylene-bis-(3-methyl-1,[4-dodecylphenyl]pentylidene) bislithium, 1,1,4,4-tetraphenyl-1,4-dilithiobutane, polybutadienyllithium, polyisoprenyllithium, polystyrene-butadienyllithium, polystyrenyllithium. poly-1,3-cyclohexadienyllithium, polystyrene-1,3-cyclohexadienyllithium, polybutadiene-1,3-cyclohexadienyllithium and the like are preferred. Examples of the more preferable organic lithium compound include n-butyllithium, sec-butyllithium, tert-butyllithium, 1,3-phenylene-bis-(3-methyl-1-phenylpentylidene)bislithium and the like. These may be used alone or in combination of two or more.

An amount of the organic alkali metal compound to be used is not particularly limited. If needed, various amounts may be used. The amount is usually 0.02 to 15 wt %, preferably 0.03 to 5 wt % based on 100 wt % of the monomer. When living polymerization is attained by adding an alkali metal salt and/or an alkaline earth metal salt such as lithium chloride, lithium bromide, lithium iodide, lithium fluoride, lithium borate, sodium chloride, potassium chloride, barium chloride, barium bromide, magnesium nitrate and the like, or alkali metal alcoholates represented by $CH_3(OCH_2CH_2)_zOLi$ (z=1 to 3) to the organic alkali metal, these may be added.

A conjugated diene-based polymer or the modified polymer is usually obtained by performing anion polymerization in a solvent. The solvent is not particularly limited. In the case the above-mentioned organic alkali metal compound is used as a polymerization initiator, an inert organic solvent which does not react with the organic alkali metal compound is used. The inert organic solvent is not particularly limited as long as it is an inert organic solvent which does not react with the organic alkali metal compound. Examples thereof include aliphatic hydrocarbon solvents such as pentane, hexane, heptane, octane and the like, alicyclic hydrocarbon solvent such as cyclopentane, methylcyclopentane, cyclohexane, methylcyclohexane and the like, and aromatic hydrocarbon solvent such as benzene, xylene, toluene, ethylbenzene and the like. The inert organic solvents may be used alone or in combination of two or more depending upon the object.

A polymerization temperature is generally −10 to 150° C., preferably 0 to 120° C. Further, it is desirable that the atmosphere of a polymerization system is replaced with an inert gas such as a nitrogen gas and the like. A polymerization pressure is not particularly limited but is in such a range that a monomer and a solvent are maintained in a liquid phase in the above-mentioned polymerization range. Further, attention must be paid so that impurities which inactivate a polymerization initiator, a catalyst and a living polymer, for example, water, oxygen and the like are not mixed in the polymerization system. When polymerization is carried out using sufficiently purified solvents and a monomers having a small amount of impurities, a monodisperse living polymer having a narrow molecular weight distribution can be obtained, being preferable.

In order to prepare a modified polymer introduced a primary amino group and/or a secondary amino group into the above-mentioned conjugated diene-based polymer, any one of the above-mentioned methods may be performed alone or in combination of two or more methods. For example, a modified polymer can be obtained by performing polymerization using a polymerization initiator having an amino group and reacting a polymerization terminator having an amino group to an active point of the obtained conjugated diene-based polymer. Alternatively, a modified polymer can be prepared by polymerizing an unsaturated monomer in the presence of a polymerization initiator. Further, a modified polymer can be prepared by performing polymerization using a polymerization initiator having an amino group and reacting an unsaturated monomer having an amino group to an active point of the obtained conjugated diene-based polymer.

When a modified polymer obtained by the above-mentioned various methods has active points, the active points are inactivated usually by using a polymerization terminator. Examples of the polymerization terminator include hydrogen, alcohols such as methanol, ethanol, propanol, isopropanol, butanol, pentanol, hexanol, heptanol, octanol and the like, halogenated alkyl or derivatives thereof such as methyl chloride, ethyl chloride, propyl chloride, butyl chloride, benzyl chloride, 3-bromo-1-[N,N-bis(trimethylsilyl)]aminopropane, 2-bromo-1-[N,N-bis(trimethylsilyl)]aminoethane, 3-bromo-2,2-dimethyl-1-[N,N-bis(trimethylsilyl)]aminopropane, 2,2,5-tetramethyl-1-(3- bromopropyl)-1-aza-2,5-disilacyclopentane, 2,2,5,5-tetramethyl-1-(3-bromo-2,2-dimethyl-propyl)-1-aza-2,5-disilacyclopentane, 2,2,5,5-tetramethyl-1-(2-bromoethyl)-1-aza-2,5-disilacyclopentane, 3-bromo-1-[N-(tert-butyl-dimethylsilyl)-N-trimethylsilyl]aminopropane, 3-bromo-1-[N-{di(tert-butyl)-methylsilyl}-N-trimethylsilyl]aminopropane, 3-bromo-1-[N-(tert-butyl-dimethylsilyl)-N-trimethylsilyl]aminomethane, 3-bromo-1-[N-{di(tert-butyl)-methylsilyl}-N-trimethylsilyl]aminoethane, 3-bromo-2,2-dimethyl-1-[N-(tert-butyl-dimethylsilyl)-N-trimethylsilyl]aminopropane, 3-bromo-2,2-dimethyl-1-[N-{di(tert-butyl)-methylsilyl}-N-trimethylsilyl]aminopropane, 3-bromo-1-(N-methyl-N-trimethylsilyl)aminopropane, 3-bromo-1-(N-ethyl-N-trimethylsilyl)aminopropane, 2-bromo-1-(N-methyl-N-trimethylsilyl)aminoethane, 2-bromo-1-(N-ethyl-N-trimethylsilyl)aminoethane, 3-bromo-1-[N-methyl-N-(tert-butyl-dimethylsilyl)]aminopropane, 3-bromo-1-[N-methyl-N-{di(tert-butyl)-methylsilyl}]aminopropane, 3-bromo-1-[N-ethyl-N-(tert-butyl-dimethylsilyl)]aminopropane, 3-bromo-1-[N-ethyl-N-{di(tert-butyl)-methylsilyl}]aminopropane, 3-bromo-1-[N-methyl-N-(tert-butyl-dimethylsilyl)]aminoethane, 3-bromo-1-[N-methyl-N-{di(tert-butyl(-methylsilyl}]aminoethane, 3-bromo-1-[N-ethyl-N-(tert-butyl-dimethylsilyl)]aminoethane, 3-bromo-1-[N-ethyl-N-{di(tert-butyl(-methylsilyl}]aminoethane, 3-chloro-1-[N,N-bis(trimethylsilyl)]aminopropane, 2-chloro-1-[N,N-bis(trimethylsilyl)]aminoethane, 3-chloro-2,2-dimethyl-1-[N,N-bis(trimethylsilyl)]aminopropane, 2,2,5,5-tetramethyl-1-(3-chloropropyl)-1-aza-2,5-disilacyclopentane, 2,2,5,5-tetramethyl-1-(3-chloro-2,2-dimethyl-propyl)-1-aza-2,5-disilacyclopentane, 2,2,5-tetramethyl-1-(2-chloroethyl)-1-aza-2,5-disilacyclopentane, 3-chloro-1-[N-(tert-butyl-dimethylsilyl)-N-trimethylsilyl]aminopropane, 3-chloro-1-[N-{di(tert-butyl)-methylsilyl}-N-trimethylsilyl]aminopropane, 3-chloro-1-[N-(tert-butyl-dimethylsilyl)-N-trimethylsilyl]aminoethane, 3-chloro-1-[N-{di(tert-butyl)-methylsilyl}-N-trimethylsilyl]aminoethane, 3-chloro-2,2-dimethyl-1-[N-(tert-butyl-dimethylsilyl)-N-trimethylsilyl]aminopropane, 3-chloro-2,2-dimethyl-1-[N-{di(tert-butyl)-methylsilyl}-N-trimethylsilyl]aminopropane, 3-chloro-1-(N-methyl-N-trimethylsilyl)aminopropane, 3-chloro-1-(N-ethyl-N-trimethylsilyl)aminopropane, 2-chloro-1-(N-methyl-N-trimethylsilyl)aminoethane, 2-chloro-1-(N-ethyl-N-trimethylsilyl)aminoethane, 3-chloro-1-[N-methyl-N-(tert-butyl-dimethylsilyl)]aminopropane, 3-chloro-1-[N-methyl-N-{di(tert-butyl)-methylsilyl}]aminopropane, 3-chloro-1-[N-ethyl-N-(tert-butyl-dimethylsilyl)]aminopropane, 3-chloro-1-[N-ethyl-N-{di(tert-butyl)-methylsilyl}]aminopropane, 3-chloro -1-[N-methyl-N-(tert-butyl-dimethylsilyl)]aminoethane, 3-chloro-1-[N-methyl-N-{di(tert-butyl)-methylsilyl}]aminoethane, 3-chloro-1-[N-ethyl-N-(tert-butyl-dimethylsilyl)]aminoethane, 3-chloro-1-[N-ethyl-N-(di(tert-butyl)-methylsilyl)]aminoethane, methyl bromide, ethyl bromide, propyl bromide, butyl bromide, methyl iodide, ethyl iodide, propyl iodide, propyl iodide, 2,2,5,5,-tetramethyl-1-(3-propyl iodide)-1-aza-2,5-disilacyclopentane and the like. These may be used alone or in combination of two or more.

In the present invention, the thus obtained modified polymer is partially or selectively hydrogenated. A method of this hydrogenation and the reaction conditions are not particularly limited. Hydrogenation is usually carried out in the range of 20 to 150° C. under the hydrogen pressure in the range of 0.1 to 10 MPa in the presence of a hydrogenating catalyst. In this case, a hydrogenation rate can be arbitrarily selected by varying an amount of a hydrogenating catalyst, a hydrogen pressure at a hydrogenating reaction or a reaction time. A hydrogenation rate is usually 10% or more, and in order to improve the weather resistance, preferably 50% or more, more preferably 80% or more, particularly preferably 95% or more of an aliphatic double bond based on conjugated diene which is an unsaturated part.

As the hydrogenating catalyst, compounds containing any of elements of Periodic Table Groups Ib, IVb, Vb, VIb, VIIb and VIII, for example, compounds containing Ti, V, Co, Ni, Zr, Ru, Rh, Pd, Hf, Re and Pt elements can be usually used. Examples of the hydrogenating catalyst include metallocene series compounds containing Ti, Zr, Hf, Co, Ni, Pd, Pt, Ru, Rh, Re and the like, carrying type heterogeneous catalysts in which metal such as Pd, Ni, Pt, Rh and Ru are carried in carrier such as carbon, silica, alumina and diatomaceous earth, homogeneous Tiegler type catalyst which are a combination of an organic salt or an acetylacetone salt of Ni, Co and the like and a reducing agent such as organic aluminum and the like, organic metal compounds or complexes of Ru, Rh and the like, and fullerene and carbon nanotube in which hydrogen is occluded.

Among these, metallocene compounds containing any one of Ti, Zr, Hf, Co and Ni are preferable in that a hydrogenating reaction can be performed in an inert organic solvent in the homogeneous system. Metallocene compounds containing any one of Ti, Zr and Hf are more preferable. In particular, hydrogenating catalysts obtained by reacting a titanocene compound and alkyllithium are preferable since they are inexpensive and industrially particularly useful. Examples thereof are hydrogenating catalysts described in JP-A-1-275605, JP-A-5-271326, JP-A-5-271325, JP-A-5-222115, JP-A-11-292924, JP-A-2000-37632, JP-A-59-133203, JP-A-63-5401, JP-A-62-218403, JP-A-7-90017, JP-B-43-19960, and JP-B-4740473. The hydrogenating catalysts may be used alone or in combination of two or more.

In the first aspect of the invention, a protecting group bound to the modified polymer may be removed at any time after anion-polymerization. It is preferable that the protecting group is removed during the hydrogenation and/or after the hydrogenation. The way how to remove the protecting group is not particularly limited and it can be selected depending upon a kind of the protecting group. The way how to remove the protecting the protecting group after hydrogenation is not particularly limited and it is performed by hydrolysis and the like.

Next, the process for producing the hydrogenated modified polymer according to the second aspect of the invention is described as follows. First, a conjugated diene or a conjugated diene and another monomer are polymerized using an organic alkali metal compound as a polymerization initiator to a conjugated diene-based polymer. As the conjugated diene used at this step, the conjugated diene exemplified for the hydrogenated modified polymer of the first aspect can be used. Examples of another monomer include the aromatic vinyl compounds and the like exemplified for the hydrogenated modified polymer of the first aspect.

The thus obtained conjugated diene-based polymer is reacted with an alkoxysilane compound to a modified polymer, and preferably the alkoxysilane compound is reacted to an active point of the conjugated diene-based polymer to obtain an end-modified polymer in which a polar group is bound to an end of the polymer. Thereby, a hydrogenated modified polymer which is excellent in the affinity with a polar resin and a filler and is also excellent in the impact resistance, the strength and the adherability as compared with the previous method can be obtained.

The structure of the alkoxysilane compound is not limited as long as it can be reacted with the conjugated diene-based polymer to obtain a modified polymer. It is preferable that the alkoxysilane compound is at least one selected from the group consisting of alkoxysilane compounds represented by the general formula (6) [formula (12)]. In the general formula (6) [formula (12)], $R^{10}$ is an alkyl group having a carbon number of 1 to 20 (preferably 1 to 18, more preferably 1 to 6), an aryl group having a carbon number of 6 to 20 (preferably 6 to 12, more preferably 6 to 9), an aralkyl group having a carbon number of 7 to 20 (preferably 7 to 13, more preferably 7 to 10) or an organosiloxy group having a carbon number of 1 to 100 (preferably 1 to 50, more preferably 5 to 30) such as 1,1,1,3,3-pentamethyldisiloxy group, 1,1,1,3,3-pentaethyldisiloxy group and 1,1,1,3,3-pentaphenyldisiloxy group. And, when there are a plurality of $R^{10}$s, respective $R^{10}$s may be the same or different. And $R^{11}$ is an alkyl group having a carbon number of 1 to 20 (preferably 1 to 18, more preferably 1 to 6), an aryl group having a carbon number of 6 to 20 (preferably 6 to 12, more preferably 6 to 9) or an aralkyl group having a carbon number of 7 to 20 (preferably 7 to 13, more preferably 7 to 10) and, when there are a plurality of $R^{11}$s, respective $R^{11}$s may be the same or different. X is a substituent (provided that $OR^{11}$ is excluded) having a polar group containing at least one selected from the group consisting of a N atom, an O atom and a Si atom and, when there are a plurality of Xs, respective Xs may be the same or different, or respective Xs may be an independent substituent or form a cyclic structure. m is 1, 2, 3 or 4, and n is 0, 1, 2 or 3. The sum of m and n is 1 to 4.

In the general formula (6) [formula (12)], examples of the alkoxysilane compounds in the case there is no substituent X when n is equal to 0, include aliphatic hydrocarbon series alkoxysilane compounds such as tetraethoxysilane, tetramethoxysilane, methyltrimethoxysilane, methyltriethoxysilane, methyltributoxysilane, methylpropoxysilane, ethyltrimethoxysilane, ethyltriethoxysilane, ethyltributoxysilane, ethyltripentyloxysilane, ethyltrineopentyloxysilane, ethyltrihexyloxysilane, phenyltrimethoxysilane, phenyltriethoxysilane, phenyltributoxysilane, dimethyldimethoxysilane, dimethyldiethoxysialne, dimethyldibutoxysilane, diethyldimethoxysilane, diethyldiethoxysilane, diethyldibutoxysilane, diphenyldimethoxysilane, diphenyldiethoxysilane, diphenyldibutoxysilane, methyldimethoxyamyloxysilane and methyldiethoxyamyloxysilane, and aromatic hydrocarbon series alkoxysilane compounds such as methyltriphenoxysilane, ethyltriphenoxysilane, phenyltriphenoxysilane, dimethyldiphenoxysilane, diethyldiphenoxysilane and diphenyldiphenoxysilane.

Next, the alkoxysilane compound in which the substituent X contains a N atom is not particularly limited, examples of the alkoxysilane compounds represented by the formula (6) [formula (12)] are as follows:

① Compounds which are converted into primary amine when a protecting group is removed by hydrolysis and the like;

N,N-bis(trimethylsilyl)aminopropyltrimethoxysilane, N,N-bis(trimethylsilyl)aminopropyltriethoxysilane, N,N-bis(trimethylsilyl)aminopropyldimethylethoxysilane, N,N-bis(trimethylsilyl)aminopropyldimethylmethoxysilane, N,N-bis(trimethylsilyl)aminopropylmethyldiethoxysilane, N,N-bis(trimethylsilyl)aminopropylmethyldimethoxysilane, N,N-bis(trimethylsilyl)aminoethyltrimethoxysilane, N,N-bis(trimethylsilyl)aminoethyltriethoxysilane, N,N-bis(trimethylsilyl)aminoethyldimethylethoxysilane, N,N-bis(trimethylsilyl)aminoethyldimethylmethoxysilane, N,N-bis(trimethylsilyl)aminoethylmethyldiethoxysilane, N,N-bis(trimethylsilyl)aminoethylmethyldimethoxysilane, 1-trimethylsilyl-2-dimethoxy-1-aza-2-silacyclopentane, 1-trimethylsilyl-2-diethoxy-1-aza-2-silacyclopentane and the like.

② Compounds which are converted into secondary amine when a protecting group is removed by hydrolysis and the like;

N-methyl-N-trimethylsilylaminopropyltrimethoxysilane, N-methyl-N-trimethylsilylaminopropyltriethoxysilane, N-methyl-N-trimethylsilylaminopropyldimethylethoxysilane, N-methyl-N-trimethylsilylaminopropyldimethylmethoxysilane, N-methyl-N-trimethylsilylaminopropylmethyldiethoxysilane, N-methyl-N-trimethylsilylaminopropylmethyldimethoxysilane, N-methyl-N-trimethylsilylaminoethyltrimethoxysilane, N-methyl-N-trimethylsilylaminoethyltriethoxysilane, N-methyl-N-trimethylsilylaminoethyldimethylethoxysilane, N-methyl-N-trimethylsilylaminoethyldimethylmethoxysilane, N-methyl-N-trimethylsilylaminoethylmethyldiethoxysilane, N-methyl-N-trimethylsilylaminoethylmethyldiethoxysilane, N-phenyl-γ-aminopropyltrimethoxysilane, N-phenyl-γ-aminopropyltriethoxysilane, dimethoxymethyl-3-piperadinopropylsilane, 3-piperadinopropyltrimethoxysilane and the like.

③ Compounds converted into primary amine and/or secondary amine by hydrolysis and the like;

N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(1,3-dimethylbutylidene)-3-(trimethoxysilyl)-1-propaneamine, N-(1-methylethylidene)-3-(trimethoxysilyl)-1-propaneamine, N-ethylidene-3-(trimethoxysilyl)-1-propaneamine, N-(1-methylpropylidene)-3-(trimethoxysilyl)-1-propaneamine, N-(4-N,N-dimethylaminobenzylidene)-3-(trimethoxysilyl)-1-propaneamine, N-(1,3-dimethylbutylidene)-3-(methyldimethoxysilyl)-1-propaneamine, N-(1-methylethylidene)-3-(methyldimethoxysilyl)-1-propaneamine, N-ethylidene-3-(methyldimethoxysilyl)-1-propaneamine, N-(1-methylpropylidene)-3-(methyldimethoxysilyl)-1-propaneamine, N-(4-N,N-dimethylaminobenzylidene)-3-(e(methyldimethoxysilyl)-1-propaneamine, N-(1,3-dimethylbutylidene)-3-(methyldiethoxysilyl)-1-propaneamine, N-(1-methylethylidene)-3-(methyldiethoxysilyl)-1-propaneamine, N-ethylidene-3-(methyldiethoxysilyl)-1-propaneamine, N-(1-methylpropylidene)-3-(methyldiethoxysilyl)-1-propaneamine, N-(4-N,N-dimethylaminobenzylidene)-3-(methyldiethoxysilyl)-1-propaneamine, N-(1,3-dimethylbutylidene)-3-(dimethylmethoxysilyl)-1-propaneamine, N-(1-methylethylidene)-3-(dimethylmethoxysilyl)-1-propaneamine, N-ethylidene-3-(dimethylmethoxysilyl)-1-propaneamine, N-(1-methylpropylidene)-3-(dimethylmethoxysilyl)-1-propaneamine, N-(4-N,N-dimethylaminobenzylidene)-3-(dimethylmethoxysilyl)-1-propaneamine, N-(1,3-dimethylbutylidene)-3-(dimethylethoxysilyl)-1-propaneamine, N-(1-methylethylidene)-3-(dimethylethoxysilyl)-1- propaneamine, N-ethylidene-3-(dimethylethoxysilyl)-1-propaneamine, N-(1-methylpropylidene)-3-(dimethylethoxysilyl)-1-propaneamine, N-(4-N,N-dimethylaminobenzylidene)-3-(dimethylethoxysilyl)-1-propaneamine and the like.

④ Tertiary amine compounds;

N,N-dimethylaminopropyltrimethoxysilane, N,N-dimethylaminopropyltriethoxysilane, N,N-dimethylaminopropyldimethylethoxysilane, N,N-dimethylaminopropyldimethylmethoxysilane, N,N-dimethylaminopropylmethyldiethoxysilane, N,N-dimethylaminopropylmethyldimethoxysilane, N,N-dimethylaminoethyltrimethoxysilane, N,N-dimethylaminoethyltriethoxysilane, N,N-bismethylaminoethyldimethylethoxysilane, N,N-bismethylaminoethyldimethylmethoxysilane, N,N-bismethylaminoethylmethyldiethoxysilane, N,N-bismethylaminoethylmethyldimethoxysilane, dimethoxymethyl-2-piperidinoethylsilane, 2-piperidinoethyltrimethoxysilane and the like.

The alkoxysilane compound in which the substituent X contains an O atom is not particularly limited, examples of the alkoxysilane compounds represented by the formula (6) [formula (12)] include γ-glycidoxypropyltrimethoxysilane, γ-glycidoxypropylmethyldimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethylmethyldimethoxysilane, β-(3,4-epoxycylcohexyl)ethylmethyldiethoxysilane, γ-glycidoxypropyltriphenoxysilane, γ-glycidoxypropylmethyldiphenoxysilane, γ-glycidoxypropylmethylphenoxyethoxysilane, γ-glycidoxypropyldiethoxyphenoxysilane, γ-methacryloxypropylmethyldiphenoxysilane and the like.

Further, the alkoxysilane compound in which the substituent X contains a Si atom is not particularly limited, examples of the alkoxysilane compounds represented by the formula (6) [formula (12)] include trimethylsiloxytriphenoxysilane, trimethylsiloxytrimethoxysilane, trimethylsiloxytriethoxysilane, trimethylsiloxytributoxysilane, 1,1,3,3-tetramethyl-1-phenoxydisiloxane and the like.

Among these, the aromatic hydrocarbon series alkoxysilane compounds and the alkoxysilane compounds containing X having a polar group are preferable in view of a modifying reaction, a hydrogenating reaction and improvement in the physical properties. The alkoxysilane compounds containing X having a polar group are more preferable. In addition, among the alkoxysilane compounds containing X having a polar group, the compounds containing a N atom is preferable from a viewpoint of improvement in the physical properties. In particular, the compounds having a protected primary or secondary amino group which is converted into primary or secondary amine by removing a protecting group such as trimethylsilyl group and the like are preferable. Among them, the compound having a primary amino group is particularly preferable.

The above-mentioned alkoxysilane compounds may be used alone or in combination of two or more.

In this case, the amount of the alkoxysilane compound to be reacted is not particularly limited but a suitable amount can be added as necessary. The amount is usually 10 mole % or more, preferably 20 mole % or more, more preferably 30 mole % or more relative to the conjugated diene-based polymer, or the amount is 0.001% by weight or more, preferably 0.01% by weight or more, more preferably 0.02% by weight or more based on the amount of the conjugated diene-based polymer depending upon a molocular weight of a modifier. By selecting such the range, the affinity with a polar resin, a filler and the like can be sufficiently imparted to the final hydrogenated modified polymer, being preferable.

The content of an alkoxysilyl group in the modified polymer is generally 0.0001 to 5 mmol/g, preferably 0.001 to 1 mmol/g and more preferably 0.003 to 0.1 mmol/g. The alkoxysilyl group is normally presented at the end of the polymer chain and may be presented at the side chain.

In the process for producing the hydrogenated modified polymer of the second aspect, in order to obtain a modified polymer, an organic alkali metal compound is used as a polymerization initiator. The organic alkali metal compound may not have a protecting group. Examples of the organic alkali metal compound include the organic alkali metal compounds exemplified in the process for producing the hydrogenated modified polymer of the first aspect. In addition, the amount of the organic alkali metal compound to be used is not particularly limited but various amounts may be used as necessary. Usually, the organic alkali metal compound is used in the range described for the process for producing the hydrogenated modified polymer of the first aspect.

The modified polymer according to the second aspect is usually obtained by polymerizing in a solvent. The solvent used in the polymerization is not particularly limited. Since the above-mentioned organic alkali metal compounds are usually used as a polymerization initiator, the inert organic solvent described for the process for producing the hydrogenated modified polymer of the first aspect is preferable. The polymerization conditions such as polymerization temperature, atmosphere in polymerization system, polymerization pressure and the like may be the same conditions as those described for the process for producing the hydrogenated modified polymer of the first aspect.

In the process for producing the hydrogenated modified polymer of the second aspect, although an active point of the modified polymer can be inactivated using the alkoxysilane compound represented by the general formula (6) [formula (12)] as a polymerization terminator, other polymerization terminators may be used. As other polymerization terminator, polymerization terminators described for the process for producing the hydrogenated modified polymer of the first aspect may be used.

In the second aspect of the invention, both ① in the case using an organic alkali metal compound having a protecting group as a polymerization initiator, and ② in the case using an organic alkali metal compound having no protecting group as a polymerization initiator and using an alkoxysilane compound having a protecting group as a polymerization terminator can lead to a modified polymer having a protecting group. The effect of the protecting group is the same as that of the first aspect and it is particularly that termination reaction progresses smoothly for the purpose of introducing a desired polar group.

In the second aspect of the invention, if a protecting group is bound to the modified polymer, the protecting group may be removed at any time after anion-polymerization. It is preferable that the protecting group is removed during the hydrogenation and/or after the hydrogenation. The way how to remove the protecting group is not particularly limited and it can be the same way described at the first aspect. And it can be selected depending upon a kind of the protecting group. The way how to remove the protecting the protecting group after hydrogenation is not particularly limited and it is performed by hydrolysis and the like.

Further, when producing the hydrogenated modified polymer of the second aspect, the thus obtained modified polymer is partially or selectively hydrogenated. The above-mentioned modified polymer is obtained as the one having a protecting group and the other having no protecting group, it depends upon an organic alkali metal compound, an alkoxysilane compound and the like to be used. It is not concerned with the existence of a protecting group, but a method of this hydrogenation of the modified polymer and the reaction conditions are not particularly limited but hydrogenation may be performed using the methods and the reaction conditions described for the producing the hydrogenated modified polymer of the first aspect. And, as a hydrogenating catalyst, the hydrogenating catalysts described for the process for producing the hydrogenated modified polymer of the first aspect can be used.

In the first and second aspects of the invention, after hydrogenating or removing a protecting group, a hydrogenated modified polymer is isolated while removing the residue of a catalyst as necessary. Or after adding an antioxidant such as a phenol series and an amine series, a hydrogenated modified polymer is isolated from a hydrogenated modified polymer solution. Isolation of the hydrogenated modified polymer can be performed, for example, by a method of adding acetone or alcohol to a hydrogenated modified polymer solution allowing the polymer to precipitate, or a method of placing a hydrogenated modified polymer solution in hot water while stirring and removing a solvent by distillation. More specifically, a hydrogenated modified polymer can be isolated by contacting a hydrogenated modified polymer solution with an aqueous dilute acid or an aqueous dilute base to deprotect the polymer and, then, placing the hydrogenated modified polymer solution in hot water while stirring, and removing a solvent by distillation or the like. Thereby, a hydrogenated modified polymer which affords a molded body excellent in the impact resistance, the strength, the adherability and the molding processibility can be obtained.

Type and molecular physical properties of the above-mentioned conjugated diene-based polymer according to the present invention are not particularly limited. For example, a molecular weight is usually 30 thousands to 2 millions, preferably 40 thousands to 1 million and more preferably 50 thousands to 500 thousands in terms of weight-average molecular weight. The conjugated diene-based polymer may be such that the conjugated diene or the conjugated diene and another monomer such as the aromatic vinyl compound and the like are polymerized. From a viewpoint of the physical properties and the molding processibility of the resulting composition, a random copolymer of a conjugated diene and an aromatic vinyl compound, and a block copolymer comprising 2 or more polymer blocks selected from the following polymer blocks (A) to (E) are preferable:

(A) an aromatic vinyl compound polymer block in which an aromatic vinyl compound is 80 wt % or more
(B) a conjugated diene polymer block in which conjugated diene is 80 wt % or more
(C) a conjugated diene polymer block in which a total of a 1,2-bond content and a 3,4-bond content is less than 25 wt %
(D) a conjugated diene polymer block in which a total of a 1,2-bond content and a 3,4-bond content is 25 wt % or more and not more than 90 wt %
(E) a random copolymer block of an aromatic vinyl compound and a conjugated diene.

The random copolymer block (E) may contain a taper type in which the content of an aromatic vinyl compound varies continuously in one molecule. Examples of the "block copolymer comprising 2 or more polymer blocks selected from polymer blocks of (A) to (E)" include (A)-(B), (A)-(C), (A)-(D), (A)-(E), (C)-(D), (C)-(E), [(A)-(B)]x-Y, [(A)-(C)]x-Y, [(A)-(D)]x-Y, [(A)-(E)]x-Y, [(C)-(D)]x-Y, [(C)-(E)]x-Y, (A)-(B)-(C), (A)-(B)-(E), (A)-(B)-(A), (A)-(C)-(A), (A)-(D)-(A), (A)-(D)-(C), (A)-(E)-(A), [(A)-(B)-(C)]x-Y, [(A)-(B)-(E)]x-Y, [(A)-(B)-(A)]x-Y, [(A)-(C)-(A)]x-Y, [(A)-(D)-(A)]x-Y, [(A)-(D)-(C)]x-Y, [(A)-(E)-(A)]x-Y, (A)-(B)-(A)-(B), (B)-(A)-(B)-(A), (A)-(C)-(A)-(C), (C)-(A)-(C)-(A), [(A)-(B)-(A)-(B)]x-Y, (A)-(B)-(A)-(B)-(A), [(A)-(B)-(A)-(B)-(A)]x-Y, [(B)-(A)]x-Y, [(C)-(A)]x-Y, [(D)-(A)]x-Y, [(E)-(A)]x-Y, (B)-(A)-(B)-(C), (B)-(A)-(B)-(E), (B)-(A)-(B)-(A), (B)-(A)-(C)-(A), (C)-(A)-(D)-(A), (C)-(A)-(D)-(C), (C)-(A)-(E)-(A), [(C)-(A)-(B)-(C)]x-Y, [(D)-(A)-(B)-(E)]x-Y, [(D)-(A)-(B)-(A)]x-Y, [(D)-(A)-(C)-(A)]x-Y, [(D)-(A)-(A)-(D)-(A)]x-Y, [(D)-(A)-(D)-(C)]x-Y, [(D)-(A)-(E)-(A)]x-Y, (D)-(A)-(B)-(A)-(B), (D)-(B)-(A)-(B)-(A), (D)-(A)-(C)-(A)-(C), (D)-(C)-(A)-(C)-(A), [(D)-(A)-(B)-(A)-(B)]x-Y, (D)-(A)-(B)-(A)-(B)-(A), [(D)-(A)-(B)-(A)-(B)-(A)]x-Y and the like (provided that, $x \geq 2$, and Y is a residue of a coupling agent). When formulated into the pellet form, it is preferable that an outer block component of the hydrogenated modified polymer contains at least one (A) and/or (C) polymer block.

Examples of the coupling agent include a halogen compound, an epoxy compound, a carbonyl compound, a polyvinyl compound and the like. Embodiments of the coupling agent include methyldichlorosilane, methyltrichlorosilane, butyltrichlorosilane, tetrachlorosilane, dibromoethane, epoxylated soybean oil, divinylbenzene, tetrachlorotin, butyltrichlorotin, tetrachlorogermanium, bis(trichlorosilyl)ethane, diethyl adipate, dimethyl adipate, dimethyl terephthalate, diethyl terephthalate, polyisocyanate and the like. These compounds may be used alone or in combination of two or more.

In the case a conjugated diene-based polymer is obtained by copolymerizing a conjugated diene and an aromatic vinyl compound, the ratio of the conjugated diene and the aromatic vinyl compound is not particularly limited. Usually, the ratio may be a range of 5 to 100 wt % of the conjugated diene and 95 to 0 wt % of the aromatic vinyl compound, preferably 5 to 95 wt % of the conjugated diene and 95 to 5 wt % of the aromatic vinyl compound, more preferably 30 to 92 wt % of the conjugated diene and 70 to 8 wt % of the aromatic vinyl compound based on 100 wt % of the total of these monomers.

Microstructure of the hydrogenated modified polymer or the conjugated diene-based polymer, that is, the content of 1,2-bond or 3,4-bond can be controlled by using both a Lewis base and the above-mentioned hydrocarbon solvent. Examples of the Lewis base include ether, amine and the like, more specifically, (1) ether derivatives of polyalkylene glycol such as diethyl ether, tetrahydrofuran, propyl ether, butyl ether, higher ether, tetrahydrofurfuryl methyl ether, tetrahydrofurfuryl ethyl ether, 1,4-dioxane, bis(tetrahydrofurfuryl)formal, 2,2-bis(2-tetrahydrofurfuryl) propane, ethylene glycol dibutyl ether, diethylene glycol dimethyl ether, propylene glycol diethyl ether and propylene glycol ethyl propyl ether, and (2) tertiary amines such as tetramethylethylenediamine, pyridine and tributylamine. The content of a 1,2-bond and 3,4-bond in the hydrogenated modified polymer of the invention or the conjugated diene-based polymer is usually 40% or more, preferably 50% or more, further preferably 50 to 90%, more preferably 50 to 85%.

MFR of the hydrogenated modified polymer of the invention measured at 230° C. under a load of 2.16 kg is usually 0.1 g/10 min. or more, preferably 0.5 g/10 min. or more, more preferably 0.5 to 100 g/10 min., much preferably 0.5 to 50 g/10 min. In addition, the hydrogenated modified polymer of the invention may be contacted with a compound which can react with the hydrogenated modified polymer in a solution or in a kneader such an extruder and the like. Examples of the compound which can react therewith include dicarboxylic acids such as maleic acid, itaconic acid, cis-4-cyclohexene-1,2-dicarboxylic acid and the like or anhydrides thereof, and ethylene glycol, propanediol, 1,3-butanediol, 1,4-butanediol, pentanediol, hexanediol, 2-methyl-2,4-pentadiol and the like.

The present invention provides a hydrogenated modified polymer composition having excellent properties by formulating the hydrogenated modified polymer, various polymers and the like.

The hydrogenated modified polymer composition of the present invention contains the hydrogenated modified polymer (hereinafter referred to as "Component (I)") and at least one selected from the group consisting of nonpolar polymer (hereinafter referred to as "Component (II-1)"), polar polymer (hereinafter referred to as "Component (II-2)") and filler (hereinafter referred to as "Component (III)"). The polar polymer, that is, Component (II-2) does not involve the above-mentioned hydrogenated modified polymer. The Component (II-1) and the Component (II-2) may be a resin or a rubber, respectively.

As the Component (II-1), polyolefin-based polymers and aromatic vinyl-based polymers are preferable. Examples of the polyolefin-based polymer include polyethylene resins such as very low-density polyethylene (VLDPE), linear low-density polyethylene (LLDPE), low-density polyethylene (LDPE), mediate-density polyethylene (MDPE), high-density polyethylene (HDPE) and the like, random type, block type or homo type polypropylene resins (PP), polybutadiene (PBD), poly 1-butene (PB), polymethylpentene (PMP), ethylene/propylene copolymer (EPM), ethylene/1-butene copolymer (EBM), ethylene/hexene copolymer (EHM), ethylene/octene copolymer (EOM), ethylene/propylene/1-butene copolymer (EPBM), ethylene/propylene/diene copolymer (EPDM), propylene/α-olefin (having a carbon number 4 to 20) copolymer such as propylene/1-butene copolymer (PBM) and the like. These polymers may be used alone or in combination of two or more.

Examples of the aromatic vinyl-based polymer include general polystyrene (GPPS), high-impact polystyrene (HIPS), isotactic polystyrene (iPS), syndiotactic polystyrene (sPS), poly α-methylstyrene (PαMS) and the like. These polymers may be used alone or in combination of two or more.

As the Component (II-1), a polymer having at least one selected from the group consisting of a carboxyl group (containing an acid anhydride and a carboxylic acid metal salt), a hydroxyl group, a halogen group, an epoxy group, an oxazolin group, a sulfonic acid group, an isocyanate group, a thiol group, an ester bond, a carbonate bond, an amide bond, an ether bond, an urethane bond and an urea bond is preferable. Examples of the polymer include ethylene/acrylic acid copolymer (EAA), ethylene/methacrylic acid copolymer (EMA), ethylene/glycidyl methacrylate copolymer (EGMA), ethylene/maleic anhydride/acrylic acid copolymer, ethylene/ethyl acrylate/maleic anhydride copolymer, ionomer (IO) which is ethylene-(meth)acrylic acid copolymer having the content of (meth)acrylic acid of 7 to 15 mol % and in which a neutralization degree by a metal ion such as Na, Zn, Mg and the like is 20% or more, polyvinyl acetate (PVAc), polyamide resin such as nylon 4,6 (PA46), nylon 6 (PA6), nylon 6,6 (PA66), nylon 6,10 (PA610), nylon 6,12 (PA612), nylon 12 (PA12), nylon 6,T (PA6T), nylon 9,T (PA9T), reinforced polyamide and modified polyamide made from hexamethylenediamine and terephthalic acid, polyester resin such as polyethylene terephthalate (PET), polybutylene terephthalate (PBT), polyethylene naphthalate (PEN) and polylactone, liquid cristallinity polyester (LCP), polycarbonate (PC) such as poly-2,2-bis(hydroxyphenyl)propanecarbonate, acrylic-based polymer such as ethylene/ethyl acrylate copolymer (EEA), ethylene/methyl acrylate copolymer (EMA), ethylene/isopropyl acrylate copolymer, ethylene/2-ethylhexyl acrylate copolymer, ethylene/hydroxyethyl methacrylate copolymer (HEMA), ethylene/2-hydroxypropyl methacrylate copolymer, ethylene/aminoalkyl methacrylate copolymer, ethylene/methyl methacrylate copolymer, ethylene/ethyl methacrylate copolymer, ethylene/isopropyl methacrylate copolymer, ethylene/butyl methacrylate copolymer, poly methyl methacrylate (PMMA), poly ethyl methacrylate (PEMA) and methacryl-styrene copolymer (MS Resin), polyacetal (POM), ABS resin, AES resin, ASA resin, diallyl phthalate resin (DAP), EVA resin, ethylene/vinyl propionate copolymer, phenol resin (PF), polyvinyl alcohol (PVA), ethylene/vinyl alcohol copolymer (EVOH), polyarylate (PAR), norbornene resin, polyphenylene ether (PPE) such as poly(2,6-dimethyl-1,4-phenylene ether), poly (2-methyl-6-ethyl-1,4-phenylene ether), poly(2-methyl-6-phenyl-1,4-phenylene ether) and poly(2,6-dichloro-1,4-phenylene ether), modified polyphenylene ether (modified PPE), polyethylene oxide, polyphenylene sulfide (PPS), polysulfone (PSU), polyether sulfone (PES), thermoplastic polyester elastomer, thermoplastic polyurethane elastomer, thermoplastic polyamide elastomer, α,β-unsaturated nitrile/acrylate/unsaturated diene copolymer rubber, urethane rubber, chlorinated butyl rubber, brominated butyl rubber, acrylic rubber, epichlorohydrin rubber, epichlorohydrin/ethylene oxide rubber, chloroprene rubber, chlorosufonated polystyrene, chlorinated polyethylene, chlorinated polypropylene, oxazolin-modified polystyrene, oxazolin-modified styrene/acrylonitrile copolymer and the like. These polymers may be used alone or in combination of two or more.

Among the polymers exemplified as the Component (II-1) and (II-2), a polyethylene resin containing ethylene as a structural unit, a polypropylene resin containing propylene as a structural unit and a polystyrene resin having aromatic vinyl as a structural unit, which are attributable to molecular chain structures of the Component (I), are particularly preferable and they are excellent in the physical properties improving effects and have a variety of uses. Also, polymers containing carboxyl group (containing an acid anhydride and a carboxylic acid metal salt), hydroxyl group, halogen group, epoxy group, oxazolin group, sulfonic acid group, isocyanate group, thiol group, ester bond, carbonate bond, amide bond, ether bond, urethane bond, urea bond and the like in the molecular, which are attributable to polar group such as an amino group in the Component (I), are particularly preferable and they are excellent in the physical properties improving effects and have a variety of uses.

Proportions of the hydrogenated modified polymer compositions of the present invention are as follows both in the case of comprising the Component (I) and the Component (II-1), and in the case of comprising the Component (I) and the Component (II-2). When the Component (II-1) and (II-2) are referred to as "Component (II)", the proportion (I)/(II) is preferably 1 to 99/99 to 1 (parts by mass), more preferably 5 to 95/95 to 5 (parts by mass), further preferably 10 to 90/90 to 10 (parts by mass) and especially 20 to 80/80 to 20 (parts by mass) based on 100 parts by mass of the total of them. The above-mentioned proportion leads to a satisfied required performance.

And proportion of the hydrogenated modified polymer composition of the present invention is as follows in the case of comprising the Component (I), the Component (II-1) and the Component (II-2). First, the proportion (II-1)/(II-2) is preferably 1 to 99/99 to 1 (parts by mass), more preferably 5 to 95/95 to 5 (parts by mass), further preferably 10 to 90/90 to 10 (parts by mass) based on 100 parts by mass of the total of them. And the content of the Component (I) is preferably 1 to 100 parts by mass, more preferably 5 to 50 parts by mass, most preferably 10 to 40 parts by mass based on 100 parts by mass of the less between the Component (II-1) and the Component (II-2). The above-mentioned proportion leads to a satisfied required performance.

When the composition of the present invention comprises an alkoxysilyl group-containing hydrogenated modified polymer as the Component (I), an olefin-based polymer as the Component (II-1) and an ethylene/vinyl acetate-based copolymer and/or an ethylene/(meth)acrylic ester-based copolymer as the Component (II-2), content of the Component (II-2) is preferably 99 parts by mass or less, more preferably 1 to 90 parts by mass, most preferably 2 to 50 parts by mass based on 100 parts by mass of the total of the Component (I) and the Component (II-1). The content exceeding 99 parts by mass leads to an lowering pliability.

Here, as the above-mentioned ethylene/vinyl acetate-based copolymer, ethylene/vinyl acetate copolymer, ethylene/vinyl propionate copolymer and the like are exemplified. And as the above-mentioned ethylene/(meth)acrylic ester-based copolymer, ethylene/methyl acrylate copolymer, ethylene/ethyl acrylate copolymer, ethylene/isopropyl acrylate copolymer, ethylene/n-butyl acrylate copolymer, ethylene/isobutyl acrylate copolymer, ethylene/2-ethylhexyl acrylate copolymer, ethylene/methyl methacrylate copolymer, ethylene/ethyl methacrylate copolymer, ethylene/isobutyl methacrylate copolymer, ethylene/ethyl acrylate/maleic anhydride copolymer and the like are exemplified.

Examples of the Component (III) include, in addition to magnesium hydroxide, aluminum hydroxide, zirconium hydroxide, calcium hydroxide, barium hydroxide, basic magnesium carbonate, dolomite, hydrotalcite, tin oxide, titanium oxide, zinc oxide, iron oxide, magnesium oxide, alumina, barium sulfate, calcium sulfate, sodium sulfate, calcium sulfite, calcium silicate, calcium carbonate, magnesium carbonate, phosphate compound, carbon, glass beads, glass powder, asbestos, mica, talc, silica, zeolite, kaolin, silica sand, silica stone, quartz powder, sand bar, inorganic fiber such as glass fiber and metal fiber, inorganic whisker such as potassium titanate whisker and the like. These may be used alone or in combination of two or more. Alternatively, although the Component (III) may be used without treatment, the surface of the filler may be treated with fatty acid (stearic acid, oleic acid, palmitic acid and the like) or metal salt thereof, paraffin, wax, polyethylene wax or those materials modified, organic borane, organic titanate, silane coupling agent, alumina coupling agent or the like in order to enhance the affinity with various polymers or the interface binding force.

Among them, examples of the flame retardant include magnesium hydroxide, aluminum hydroxide, zirconium hydroxide, calcium hydroxide, barium hydroxide, basic magnesium carbonate, dolomite, hydrotalcite, tin hydroxide and the like. Among them, magnesium hydroxide, aluminum hydroxide and calcium hydroxide are useful and industrially easily available, being preferable. Magnesium hydroxide is particularly preferable since it has the high flame-retarder effects. In this case of using the inorganic flame retardant, in order to enhance the flame-retarder effects, a phosphorus-containing retardant such as red phosphorus, ammonium polyphosphate series retardant and phosphoric ester, silicone compound, quartz glass and the like, as well as water glass, frit, silicon nitride short fiber for preventing drip, and the like as a flame-retardant aid may be incorporated.

Proportions of the hydrogenated modified polymer compositions of the present invention are as follows all of ① in the case of comprising the Component (I) and the Component (III), ② in the case of comprising the Component (I), the Component (II-1) and the Component (III), ③ in the case of comprising the Component (I), the Component (II-2) and the Component (III), and ④ in the case of comprising the Component (I), the Component (II-1), the Component (II-2) and the Component (III). That is, the content of the Component (III) is preferably 1 to 500 parts by mass, more preferably 2 to 300 parts by mass and most preferably 5 to 150 parts by mass based on 100 parts by mass of the total of the polymer component such as the Component (I). By controlling such range, the properties such as the flame resistance and the strength can be imparted without adversely affecting the effects of the Component (I), the Component (II-1) and the Component (II-2).

As other additives, an antioxidant, a weather resistant agent, a metal deactivator, a stabilizer such as a photostabilizer, an ultraviolet absorbing agent, thermalstabilizer, an antibacterial agent, a mildewproofing agent, a dispersing agent, a softening agent, a plasticizer, a cross-linking agent, a co-cross-linking agent, a vulcanizing agent, a vulcanizing aid, a foaming agent, a foaming aid, a coloring agent, a metal powder such as ferrite, a carbon fiber, an organic fiber such as an aramid fiber, a composite fiber and the like may be incorporated to the hydrogenated modified polymer composition of the present invention. And a graphite, a pumice, an ebo powder, a cotton floc, a cork powder, a fluororesin, polymer beads, a polyolefin wax, a cellulose powder, a rubber powder, a low-molecular weight polymer and the like may be incorporated.

When the hydrogenated modified polymer composition is vulcanized, the method is not limited. The method how to vulcanize it includes sulfur vulcanization, peroxide vulcanization, electron beam vulcanization, ultraviolet vulcanization, radiation vulcanization, metal ion vulcanization, silane vulcanization, resin vulcanization and the like.

For producing the hydrogenated modified polymer composition, the previously known kneader such as an extruding machine, a pressure kneader, a Banbury mixer, and a combination of them may be used. Kneading may be performed with each component at once, or a multi-step kneading may be performed in which, after arbitrary components are kneaded, remaining components are added and kneaded. In addition, the polymer composition thus obtained can be molded by the known method such as injection molding, two color-injection molding, extrusion molding, rotation molding, press molding, hollow molding, sandwich molding, compression molding, vacuum molding, powder slash molding, laminated molding, calendar molding and blow molding. And as necessary, processing such as foaming, drawing, adhesion, printing, painting, plating may be performed.

The hydrogenated modified polymer composition of the present invention provides a molded body excellent in the balance among the impact resistance, the strength, the molding processibility and the adherability.

DESCRIPTION OF THE PREFERRED EMBODIMENTS

The present invention will be specifically explained by way of Examples. In the following explanation, all "parts" and "%" are by weight unless otherwise noted.

[1] EXPERIMENTAL EXAMPLE 1

1-1. Preparation of a Hydrogenating Catalyst

Hydroganating catalysts (catalysts A and B) used in Examples and Comparative Examples were prepared by the following method.

<Preparation 1> Synthesis of a Catalyst A [bis($\eta^5$-cyclopentadienyl)titanium (tetrahydrofurfuryloxy)chloride]

A three-neck flask having a volume of 1 L equipped with a stirrer and an addition funnel was replaced with dry nitrogen, and 200 ml of anhydrous tetrahydrofuran and 0.2 mole of tetrahydrofurfuryl alcohol were added. Thereafter, a n-butyllithium (hereinafter referred to as "n-BuLi")/cyclohexane solution (0.2 mole) was added dropwise to the three-neck flask at 15° C. to react them, whereby, a solution of tetrahydrofurfuryloxylithium in tetrahydrofuran was obtained.

Then, a three-neck flask having a volume of 1 L equipped with a stirrer and an addition funnel was replaced with dry nitrogen, 49.8 g (0.2 mole) of bis($\eta^5$-cyclopentadienyl)titanium dichloride and 250 ml of anhydrous tetrahydrofuran were added. Then, the solution of tetrafurfuryloxylithium in tetrahydrofuran obtained by the above-mentioned method was added dropwise for about 1 hour while stirring at room temperature. After about 2 hours, the red brown solution was filtered, the insolubles were washed with dichloromethane. Thereafter, the filtrate and the wash were combined and the solvent was removed under reduced pressure to obtain a catalyst A [bis($\eta^5$-cyclopentadienyl)titanium (tetrahydrofurfuryloxy)chloride] (also referred as to "[chloro bis(2,4-cyclopentadienyl)titanium (IV) tetrahydrofurfurylalkoxide]"). The yield was 95%.

<Preparation 2> Synthesis of a Catalyst B [bis($\eta^5$-cyclopentadienyl)titanium (furfuryloxy)chloride]

A three-neck flask having a volume of 1 L equipped with a stirrer and an addition funnel was replaced with dry nitrogen, and 200 ml of anhydrous tetrahydrofuran and 0.2 mole of furfuryl alcohol were added. Thereafter, a n-BuLi/cyclohexane solution (0.2 mole) was added dropwise to the three-neck flask at 15° C. to react them, whereby, a solution of furfuryloxylithium in tetrahydrofuran was obtained.

Then, a three-neck flask having a volume of 1 L equipped with a stirrer and an addition funnel was replaced with dry nitrogen, 49.8 g (0.2 mole) of bis($\eta^5$-cyclopentadienyl)titanium dichloride and 250 ml of anhydrous tetrahydrofuran were added. Then, the solution of furfuryloxylithium in tetrahydrofuran obtained by the above-mentioned method was added dropwise for about 1 hour while stirring at room temperature. After about 2 hours, the red brown solution was filtered, and the insolubles were washed with dichloromethane. Thereafter, the filtrate and the wash were combined, and the solvent was removed under reduced pressure to obtain a catalyst B [bis($\eta^5$-cyclopentadienyl)titanium (furfuryloxy)chloride] (also called "[chloro bis(2,4-cyclopentadienyl)titanium (IV) furfurylalkoxide]"). The yield was 97%.

1-2. Preparation of a Hydrogenated Modified Polymer

Hydrogenated modified polymers of Examples (I-1 to 15) were prepared according to the following methods. In addition, measurement of various properties of the hydrogenated modified polymers was according to the following method. The results are shown in Table 1 and 2.

① Microstructure of a Copolymer (1,2-Bond Content and 3,4-Bond content)

It is analyzed by an infrared analysis (Molero method).

② Bound Styrene Content

It is analyzed by an infrared analysis and calculated by making a calibration curve.

③ Weight-Average Molecular Weight

It is obtained by using gel permeation chromatography (GPC) (HLC-8120 TOSOH Co. Ltd.) and is represented as a standard polystyrene.

④ Coupling Rate

A coupling rate is a value representing how many coupled or branched polymers are contained in a total polymer. It is calculated from a proportion of a coupled polymer after addition of a coupling agent by GPC analysis.

⑤ MFR (Melt Flow Rate)

It is measured under the conditions of 230° C. and 2.16 kg or 10 kg according to JIS K7210.

⑥ Modified Rate (Number/Polymer)

It is a proportion of a polar group containing in a polymer and is expressed by the following equation.

Modified rate=polar group (number)/polymer (one molecular chain)

When there is a phenoxy group, after purification of a polymer, the rate was obtained by determination with absorption at 1250 cm$^{-1}$ according to infrared spectrum. Alternatively, when there is an amino group, the rate was obtained by determination with an amine titration method described in Anal. Chem. 564(1952). That is, the rate was obtained by purifying a hydrogenated modified polymer, dissolving it in an organic solvent, and titrating with HClO$_4$/CH$_3$COOH until the color of the solution turned from purple to blue, using methylviolet as an indicator.

⑦ Hydrogenation Rate of Conjugated Diene

It is calculated from $^1$H-NMR spectrum at 270 MHz using carbon tetrachloride as a solvent.

EXAMPLE 1

Polymerization of a Hydrogenated Modified SEBS Polymer 5,000 g of cyclohexane, 150 g of tetrahydrofuran, 400 g of styrene and 2.88 g of 3-lithio-1-N,N-bis(trimethylsilyl)aminopropane as a modifier were added to a reactor having an inner volume of 10 L replaced with nitrogen, and polymerization was performed at initiation temperature of 50° C. After completion of the reaction, a temperature was maintained at 20° C., and 500 g of 1,3-butadiene was added to perform adiabatic polymerization. After 30 minutes, 100 g of styrene was added, and polymerization was continued. Then, the reaction solution was maintained above 80° C., and hydrogen was introduced into the system. Then, 0.32 g of the catalyst A and 0.39 g of tetrachlorosilane were added, which was reacted for 1 hour while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain a hydrogenated modified SEBS polymer (I-1) while removing a protecting group.

EXAMPLE 2

Polymerization of a Hydrogenated Modified SEBS Polymer 5,000 g of cyclohexane, 150 g of tetrahydrofuran, 100 g of styrene and 2.89 g of 2,2,5,5-tetramethyl-1-(3-lithiopropyl)-1-aza-2,5-disilacyclopentane as a modifier were added to a reactor having an inner volume of 10 L replaced with nitrogen, polymerization was performed at initiation temperature of 50° C. After completion of the reaction, a temperature was maintained at 20° C., and 850 g of 1,3-butadiene was added to perform adiabatic polymerization. After 30 minutes, 50 g of styrene was added and polymerization was continued. Then, the reaction solution was maintained above 80° C., and hydrogen was introduced in the system. Then, 0.55 g of the catalyst B and 0.39 g of tetrachlorosilane were added, which was reacted for 1 hour while maintaining a hydrogen pressure of 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-2).

EXAMPLE 3

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 3 in Table 1, a SEBS polymer was obtained according to Example 1. Then, 7.4 g of 4-[2-{N,N-bis(trimethylsilyl)amino}ethyl]styrene was added and reacted to active points of the SEBS polymer for 30 minutes. The reaction solution was maintained above 80° C., and hydrogen was introduced in the system. Then, 2.97 g of a dichlorotris(triphenylphosphine)ruthenium catalyst was added, which was reacted for 1 hour while maintaining a hydrogen pressure at 2.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-3).

EXAMPLE 4

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 4 in Table 1, a SEBS polymer was obtained according to Example 1. Then, 4.28 g of N,N-bis(trimethylsilyl)aminopropylmethyldimethoxysilane was added and reacted to active points of the SEBS polymer for 30 minutes. Then, the reaction solution was maintained above 80° C., and hydrogen was introduced in the system. Then, 0.32 g of the catalyst A, 0.15 g of diethylaluminum chloride and 0.27 g of n-BuLi were added and reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-4).

EXAMPLE 5

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 5 in Table 1, a SEBS polymer was obtained according to Example 1. Then, 4.23 g of N,N-bis(trimethylsilyl)aminopropylmethyldimethoxysilane was added and reacted to active points of the SEBS polymer for 30 minutes. Then, the reaction solution was maintained above 80° C., and hydrogen was introduced in the system. Then, 0.55 g of the catalyst A, 0.25 g of triethylaluminum and 0.45 g of n-BuLi were added, which was reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-5).

EXAMPLE 6

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 6 in Table 1, a SEBS polymer (I-6) of Example 6 was obtained according to Example 5.

EXAMPLE 7

Polymerization of a Hydrogenated Modified SEBS Polymer [(Polystyrene)-(Intermediate 1,2-Bond Content Polybutadiene)-(Low 1,2-Bond Content Polybutadiene)]

5,000 g of cyclohexane, 0.25 g of tetrahydrofuran, 300 g of 1,3-butadiene and 0.9 g of n-BuLi were added to a reactor having an inner volume of 10 L replaced with nitrogen, and polymerization was performed at a polymerization initiation temperature of 70° C. After completion of the reaction, a temperature was maintained at 30° C., and 18 g of tetrahydrofuran and 500 g of 1,3-butadiene were added to perform adiabatic polymerization. After 30 minutes, 200 g of styrene was added, which was reacted for 30 minutes. The 1,2-bond content of the first stage butadiene block of the resulting polymer was 14%, and the 1,2-bond content of the second stage butadiene block was 50%. Then, 4.13 g of N,N-bis(trimethylsilyl)aminopropylmethyldiethoxysilane was added and reacted to active points of the SEBS polymer for 30 minutes. Then, the hydrogenating reaction and solvent distillation were carried out according to the same manner as that of Example 4 to obtain a hydrogenated modified polymer (I-7).

EXAMPLE 8

Polymerization of a Hydrogenated Modified CEBC Polymer [(Low 1,2-Bond Content Polybutadiene)-(High 1,2-Bond Content Polybutadiene)-(Low 1,2-Bond Content Polybutadiene)]

5,000 g of cyclohexane, 0.25 g of tetrahydrofuran, 300 g of 1,3-butadiene and 0.85 g of n-BuLi were added to a reactor having an inner volume of 10 L replaced with nitrogen, polymerization was performed at a polymerization initiation temperature of 70° C. After completion of the reaction, a temperature was maintained at 20° C., and 75 g of tetrahydrofuran and 700 g of 1,3-butadiene were added to perform adiabatic polymerization. Then, 0.4 g of N,N-bis(trimethylsilyl)aminopropyltrimethoxysilane was added to this system, and 2.0 g of methyldichlorosilane was further added, which was reacted for 30 minutes. The 1,2-bond content of the first stage butadiene block of the resulting polymer was 14%, and the 1,2-bond content of the second stage butadiene block was 80%. Then, the hydrogenating reaction and solvent distillation were carried out according to the same manner as that of Example 5 to obtain a hydrogenated modified polymer (I-8).

EXAMPLE 9

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 9 in Table 2, a SEBS polymer was obtained according to Example 1. Then, 3.1 g of methyltriphenoxysilane was added and reacted to active points of the SEBS polymer for 30 minutes. Then, the reaction solution was maintained above 80° C., and hydrogen was introduced in the system. Then, 0.32 g of the catalyst A, 1.10 g of triethylaluminum and 0.45 g of n-BuLi were added, which was reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-9).

EXAMPLE 10

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 10 in Table 2, a SEBS polymer was obtained according to Example 1. Then, 1.56 g of benzylideneethylamine was added and reacted to active points of the SEBS polymer for 30 minutes. Then, the reaction solution was maintained above 80° C., and hydrogen was introduced in the system. Then, 2.60 g of the Pd—$BaSO_4$ catalyst was added, which was reacted for 1 hour while maintaining a hydrogen pressure at 2.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-10).

EXAMPLE 11

Polymerization of a Hydrogenated Modified SEBS Polymer

By using 2,2,5,5-tetramethyl-1-(3-lithiopropyl)-1-aza-2,5-disilacyclopentane as a polymerization initiator and varying an amount of a polymerization initiator, a kind of a monomer, an amount of a monomer, a polymerization temperature, a polymerization time and the like so as to obtain a copolymer structure before hydrogenation shown by Example 11 in Table 2, a SEBS polymer was obtained according to Example 1. Then, 4.23 g of N,N-bis(trimethylsilyl)aminopropylmethyldiethoxysilane was added and reacted to active points of the SEBS polymer for 30 minutes. Then, the reaction solution was maintained above 80° C., and hydrogen was introduced in the system, and the hydrogenating reaction and solvent distillation were carried out according to the same manner as that of Example 4 to obtain a hydrogenated modified polymer (I-11).

EXAMPLE 12

Polymerization of a Hydrogenated Modified SEBS Polymer 5,000 g of cyclohexane, 3.6 g of propylene glycol ethyl propyl ether, 50 g of 1,3-butadiene and 5.1 g of 1,3-phenylene-bis-(3-methyl-1-phenylpentylidene)bislithium were added to a reactor having an inner volume of 10 L replaced with nitrogen, polymerization was performed at a polymerization initiation temperature of 20° C. to react for 30 minutes. 750 g of 1,3-butadiene was further added to perform adiabatic polymerization. After 30 minutes, 200 g of styrene was added to perform further polymerization. Then, 8.23 g of N,N-bis(trimethylsilyl)aminopropylmethyldiethoxysilane was added and reacted to active points of the SEBS polymer for 30 minutes. Then, the reaction solution was maintained above 80° C., and hydrogen was introduced in the system. Then, 0.78 g of the catalyst A, 0.66 g of diethylaluminum chloride and 0.65 g of n-BuLi were added, which was reacted for 1 hour while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain a hydrogenated modified SEBS polymer (I-12).

EXAMPLE 13

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 13 in Table 2, a SEBS polymer was obtained according to Example 1. Then, 6.9 g of N,N-bis (trimethylslyl)aminopropylmethyldiethoxysilane was added and reacted to active points of the SEBS polymer for 30 minutes. Then, the reaction solution was maintained above 80° C., and hydrogen was introduced in the system. Then, 0.19 g of the catalyst A and 1.25 g of diethylaluminum chloride were added, which was reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-13).

EXAMPLE 14

Polymerization of a Hydrogenated Modified SEBS Polymer

By using n-BuLi as a polymerization initiator and varying an amount of a polymerization initiator, a kind of a monomer, an amount of a monomer, a polymerization temperature, a polymerization time and the like so as to obtain a copolymer structure before hydrogenation shown by Example 14 in Table 2, a SEBS polymer was obtained according to Example 1. Then, 1.8 g of N,N-bis (trimethylslyl)aminopropylmethyldiethoxysilane was added and reacted to active points of the SEBS polymer for 30 minutes. Then, the reaction solution was maintained above 80° C., and hydrogen was introduced in the system. Then, 0.58 g of the catalyst A and 0.65 g of diethylaluminum chloride were added, which was reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-14).

EXAMPLE 15

Polymerization of a Hydrogenated Modified CEBC Polymer [(Low 1,2-Bond Content Polybutadiene)-(High 1,2-Bond Content Polybutadiene)-(Low 1,2-Bond Content Polybutadiene)]

5,000 g of cyclohexane, 0.25 g of tetrahydrofuran, 300 g of 1,3-butadiene and 0.85 g of n-BuLi were added to a reactor having an inner volume of 10 L replaced with nitrogen, polymerization was performed at a polymerization initiation temperature of 70° C. After completion of the reaction, a temperature was maintained at 20° C., and 5.0 g of tetrahydrofuran and 700 g of 1,3-butadiene were added to perform adiabatic polymerization. Then, 0.4 g of N,N-bis (trimethylsilyl)aminopropyltrimethoxysilane was added to this system, and 2.3 g of methyldichlorosilane was further added, which was reacted for 30 minutes. The 1,2-bond content of the first stage butadiene block of the resulting polymer was 14%, and the 1,2-bond content of the second stage butadiene block was 34%. Then, the hydrogenating reaction and solvent distillation were carried out according to the same manner as that of Example 5 to obtain a hydrogenated modified polymer (I-15).

Upon evaluation of the hydrogenated modified polymers (I-1 to 15) obtained in Examples 1 to 15, as Comparative Example, unmodified hydrogenated polymers (①to ⑤) shown in Table 3 were prepared.

TABLE 1

| | Example | | | | | | | |
|---|---|---|---|---|---|---|---|---|
| | 1 | 2 | 3 | 4 | 5 | 6 | 7 | 8 |
| Component (I) | I-1 | I-2 | I-3 | I-4 | I-5 | I-6 | I-7 | I-8 |
| Copolymer structure before hydrogenation | | | | | | | | |
| Styrene (wt %) | 50 | 15 | 15 | 50 | 15 | 15 | 20 | 0 |
| Butadiene (wt %) | 50 | 85 | 85 | 50 | 85 | 85 | 80 | 100 |
| 1,2-Bond content (%) | 80 | 78 | 79 | 79 | 78 | 65 | 50* | 80* |
| Coupling rate (%) | 3.7 | 4.3 | 9.7 | 8.5 | 10.1 | 9.3 | 11.2 | 85 |
| Weight-average molecular weight (× $10^4$) | 10.1 | 11.8 | 12.3 | 9.2 | 11.7 | 11.9 | 11.6 | 29.6 |
| Modifier used | (a) | (b) | (c) | (d) | (e) | (e) | (e) | (f) |
| Hydrogenated modified polymer | | | | | | | | |
| Hydrogenation rate (%) | 98 | 97 | 99 | 99 | 98 | 98 | 97 | 97 |
| MFR (g/10 min.) | 2.7 | 22.1 | 17.4 | 3.4 | 16.6 | 10.5 | 5.9 | 0.7 |
| Modified rate (number/polymer) | 0.97 | 0.98 | 1.78 | 0.8 | 0.84 | 0.82 | 0.73 | 0.43 |

(a): 3-lithio-1-N,N-bis(trimethylsilyl)aminopropane
(b): 2,2,5,5-tetramethyl-1-(3-lithiopropyl)-1-aza-2,5-disilacyclopentane
(c): 4-[2-{N,N-bis(trimethylsilyl)amino}ethyl]styrene
(d): N,N-bis(trimethylsilyl)aminopropylmethyldimethoxysilane
(e): N,N-bis(trimethylsilyl)aminopropylmethyldiethoxysilane
(f): N,N-bis(trimethylsilyl)aminopropyltrimethoxysilane
*1,2-Bond content in Examples 7 and 8 shows the one of the second stage butadiene block.

TABLE 2

|  | Example | | | | | | |
|---|---|---|---|---|---|---|---|
|  | 9 | 10 | 11 | 12 | 13 | 14 | 15 |
| Component (I) | I-9 | I-10 | I-11 | I-12 | I-13 | I-14 | I-15 |
| Copolymer structure before hydrogenation | | | | | | | |
| Styrene (wt %) | 50 | 15 | 15 | 20 | 70 | 10 | 0 |
| Butadiene (wt %) | 50 | 85 | 85 | 80 | 30 | 90 | 100 |
| 1,2-Bond content (%) | 80 | 80 | 78 | 78 | 52 | 80 | 34 |
| Coupling rate (%) | 23.7 | 13 | 13.2 | 3.1 | 5.9 | 6 | 70 |
| Weight-average molecular weight (× $10^4$) | 13.4 | 12.8 | 11.9 | 12.7 | 5.5 | 29.0 | 13.6 |
| Modifier used | (g) | (h) | (b), (e) | (e) | (e) | (e) | (f) |
| Hydrogenated modified polymer | | | | | | | |
| Hydrogenation rate (%) | 98 | 98 | 98 | 98 | 97.8 | 98.4 | 99 |
| MFR (g/10 min.) | 0.5 | 4.4 | 10.5 | 23.2 | 1.0 | 2.8 | 2.0 |
| Modified rate (number/polymer) | 0.86 | 0.81 | 1.70 | 0.86 | 0.81 | 0.84 | 1.78 |

(b): 2,2,5,5-tetramethyl-1-(3-lithiopropyl)-1-aza-2,5-disilacyclopentane
(e): N,N-bis(trimethylsilyl)aminopropylmethyldiethoxysilane
(f): N,N-bis(trimethylsilyl)aminopropyltrimethoxysilane
(g): methyltriphenoxysilane
(h): N-benzylideneethylamine

TABLE 3

| Unmodified hydrogenated polymer | ① | ② | ③ | ④ | ⑤ |
|---|---|---|---|---|---|
| Copolymer structure | SEBS | SEBS | SEBS | SEBC | CEBC |
| Styrene (wt %) | 50 | 15 | 15 | 20 | — |
| Butadiene (wt %) | 50 | 85 | 85 | 80 | 100 |
| 1,2-Bond content (%) | 80 | 78 | 65 | 50* | 80* |
| Coupling rate (%) | 2.1 | 2.0 | 1.3 | 3.4 | 88 |
| Weight-average molecular weight (× $10^4$) | 9.8 | 12.1 | 12.3 | 12.0 | 29.7 |
| Hydrogenated polymer | | | | | |
| Hydrogenation rate (%) | 98 | 98 | 98 | 98 | 99 |
| MFR (g/10 min.) | 3.6 | 25 | 15 | 6.0 | 2.3 |

*1,2-Bond content in ④ and ⑤ shows the one of the second stage butadiene block.

1-3. Evaluation of Physical Properties

Using the hydrogenated modified polymers of (I-3), (I-5) and (I-12) obtained by the above-mentioned method, mixing was performed according to the formulation shown in Table 4. As the Component (II-2), polyethylene terephthalate (PET) (Trade name; "RT523C" Nippon Unipet Co. Ltd.) was used. In addition, the unmodified hydrogenated polymer ② shown in Table 3 was used. The resulting mixture was melted and kneaded using a biaxial extruder to obtain a composition, which was thereafter converted into pellets. Then, the pellets were used to make test pieces for evaluation of physical properties by injection molding. Then, physical properties of each test piece of Examples 16 to 18 and Comparative Examples 1 to 2 were measured according to the following method. The results are shown in Table 4.

① Rigidity

Flexural modules was measured under the condition of 23° C. by three points-bending test method according to ASTM D790, and this was used as a measure for the rigidity.

② Impact Resistance

Izod impact strength was measured under the temperature condition of 23° C. by an Izod impact tester according to ASTM D256, and this was used as a measure for the impact resistance.

③ Falling Weight Impact Strength

As another measure expressing the impact resistance, falling weight impact strength was measured. It was obtained by injection-molding a polymer composition, placing the resulting plate-like test piece of 3.2 mm on a 25 mmφ hole, striking the piece at a rate of 2.4 m/s using a 15.7 mmφ striking bar having a hemi-spherical tip, and calculating the destruction energy from measurement of a displacement and a load until destruction of the test piece. A magnitude of the calculated value was used as a measure for falling weight impact strength.

④ Tensile Breaking Strength and Tensile Extension

It was measured by performing a tensile test on a test piece under the temperature condition at 23° C. according to ASTM D638.

⑤ Image Clarity

It was determined with naked eyes on the surface of a test piece obtained by molding the polymer composition into plate-like by injection molding according to the following criteria:

○: Distortion of an image printed on a test piece is small.
Δ: Distortion of an image printed on a test piece is between ○ and x.
x: Distortion of an image printed on a test piece is large.

⑥ Peeling between Layers

A nick is formed with a cutter on a test piece obtained by molding the polymer composition into plate-like by injection molding, an adhesive tape was put on the nick and the adhesive tape was slowly stretched immediately so that an angle between the adhesive tape and the plate became 90 degree, whether the surface of the plate is peeled or not is confirmed with naked eyes, and assessment was performed with naked eyes according to the following criteria:

○: Surface is not peeled.
x: Surface is peeled.

TABLE 4

|  | Example | | | Comparative | |
| --- | --- | --- | --- | --- | --- |
|  | 16 | 17 | 18 | 1 | 2 |
| Component (I) | I-3 | I-5 | I-12 | — | — |
| Content of Component (I) (wt %) | 10 | 10 | 10 | — | — |
| Unmodified hydrogenated polymer | — | — | — | — | ② |
| Content of unmodified hydrogenated polymer (wt %) | — | — | — | — | 10 |
| Content of Component (II-2) (wt %) | 90 | 90 | 90 | 100 | 90 |
| Rigidity (MPa) | 2,150 | 2,180 | 2,300 | 2,650 | 2,200 |
| Impact resistance (kgcm/cm) | 10.1 | 9.2 | 12.5 | 3.8 | 5.0 |
| Falling weight impact strength (kgcm/cm) | 3,280 | 3,210 | 3,290 | 2,830 | 2,500 |
| Tensile breaking extension (%) | 750 | 740 | 820 | 80 | 120 |
| Image clarity | ○ | ○ | ○ | ○ | Δ |
| Peeling between layers | ○ | ○ | ○ | ○ | X |

Then, using the hydrogenated modified polymers (I-1, 2, 4 to 11) obtained by the above-mentioned method, mixing was performed according to the formulation shown in Tables 5 and 6. As the Component (II-1), homotype polypropylene (Trade name; "K1016" Chisso Corp.) was used. And as the Component (II-2), polyethylene terephthalate (Trade name; "RT523C" Nippon Unipet Co. Ltd.) was used. In addition, unmodified hydrogenated polymers ① to ⑤ shown in Table 3 were used. The resulting mixture was melt and kneaded into a composition using a biaxial extruder and converted into pellets. Then, the pellets were used to make test pieces for evaluation of physical properties by injection molding. Then, physical properties of each test piece of Examples 19 to 28 and Comparative Examples 3 to 8 were measured according to the following method. The results are shown in Tables 5 and 6.

TABLE 5

|  | Example | | | | | | | | | |
| --- | --- | --- | --- | --- | --- | --- | --- | --- | --- | --- |
|  | 19 | 20 | 21 | 22 | 23 | 24 | 25 | 26 | 27 | 28 |
| Component (I) | I-1 | I-2 | I-4 | I-5 | I-6 | I-7 | I-8 | I-9 | I-10 | I-11 |
| Content of Component (I) (wt %) | 5 | 5 | 5 | 5 | 5 | 5 | 5 | 5 | 5 | 5 |
| Unmodified hydrogenated polymer | — | — | — | — | — | — | — | — | — | — |
| Content of unmodified hydrogenated polymer (wt %) | — | — | — | — | — | — | — | — | — | — |
| Content of Component (II-1) (wt %) | 80 | 80 | 80 | 80 | 80 | 80 | 80 | 80 | 80 | 80 |
| Content of Component (II-2) (wt %) | 15 | 15 | 15 | 15 | 15 | 15 | 15 | 15 | 15 | 15 |
| Rigidity (MPa) | 1,680 | 1,170 | 1,640 | 1,240 | 1,300 | 1,080 | 980 | 1,550 | 1,030 | 1,560 |
| Impact resistance (kgcm/cm) | 7.6 | 7.9 | 7.8 | 8.3 | 9.0 | 7.5 | 6.3 | 6.1 | 6.8 | 12.1 |
| Falling weight impact strength (kgcm/cm) | 2,310 | 2,070 | 2,400 | 2,240 | 2,420 | 2,120 | 1,470 | 2,150 | 1,680 | 2,830 |
| Tensile breaking extension (%) | 930 | 970 | more than 1,000 | 950 | 980 | more than 1,000 | 840 | 760 | 750 | more than 1,000 |
| Image clarity | ○ | ○ | ○ | ○ | ○ | ○ | ○ | ○ | ○ | ○ |
| Peeling between layers | ○ | ○ | ○ | ○ | ○ | ○ | ○ | ○ | ○ | ○ |

TABLE 6

|  | Comparative example | | | | | |
| --- | --- | --- | --- | --- | --- | --- |
|  | 3 | 4 | 5 | 6 | 7 | 8 |
| Component (I) | — | — | — | — | — | — |
| Content of Component (I) (wt %) | — | — | — | — | — | — |
| Unmodified hydrogenated polymer | — | ① | ② | ③ | ④ | ⑤ |
| Content of unmodified hydrogenated polymer (wt %) | — | 5 | 5 | 5 | 5 | 5 |
| Content of Component (II-1) (wt %) | 80 | 80 | 80 | 80 | 80 | 80 |
| Content of Component (II-2) (wt %) | 15 | 15 | 15 | 15 | 15 | 15 |
| Rigidity (MPa) | 1,740 | 1,440 | 1,280 | 1,350 | 1,240 | 940 |
| Impact resistance (kgcm/cm) | 2.3 | 2.4 | 3.3 | 3.5 | 3.3 | 3.7 |
| Falling weight impact strength (kgcm/cm) | 30 | 380 | 690 | 730 | 750 | 510 |
| Tensile breaking extension (%) | 190 | 550 | 600 | 700 | 590 | 540 |
| Image clarity | Δ | Δ | Δ | Δ | Δ | Δ |
| Peeling between layers | X | X | X | X | X | X |

Then, using the hydrogenated modified polymers (I-5), (I-6), (I-9) and (I-14) obtained by the above-mentioned method, mixing was formed according to the formulation shown in Table 7. As the Component (II-1), polypropylene (Trade name; "K8017" Chisso Corp.) was used. As a Component (III), magnesium hydroxide imparting the flame retardancy (Trade name; "Kisma 5PH" Kyowa Kagaku Co. Ltd.) was used. The unmodified hydrogenated polymer ② shown in Table 3 was used. These components were mixed using a uniaxial extruder adjusted at 220° C. into a composition, which was extrusion-molded to obtain test pieces for evaluation of physical properties. Performance evaluation was carried out on each test piece of Examples 29 to 32 and Comparative Example 9 by the above-mentioned method. The results are shown in the following Table 7. MFR was measured at 230° C. and a load of 10 kg.

TABLE 7

|  | Example |  |  |  | Comparative |
|---|---|---|---|---|---|
|  | 29 | 30 | 31 | 32 | 9 |
| Component (I) | I-5 | I-6 | I-9 | I-14 | — |
| Content of Component (I) (wt %) | 25 | 25 | 25 | 25 | — |
| Unmodified hydrogenated polymer | — | — | — | — | ② |
| Content of unmodified hydrogenated polymer (wt %) | — | — | — | — | 25 |
| Content of Component (II-1) (wt %) | 15 | 15 | 15 | 15 | 15 |
| Content of Component (III) (wt %) | 60 | 60 | 60 | 60 | 60 |
| MFR (g/10 min.) | 29 | 30 | 32 | 26 | 48 |
| Tensile breaking strength (MPa) | 15.3 | 15.7 | 13.1 | 14.3 | 7.8 |
| Tensile breaking extension (%) | 300 | 280 | 250 | 290 | 290 |

[2] EXPERIMENTAL EXAMPLE 2

2-1. Production of a Hydrogenated Modified Polymer

Hydrogenated modified polymers of Examples (I-16 to 20) were produced by the following method. Measurement of various properties in Examples was made by the method described in Experimental Example 1. The results are shown in Table 8.

EXAMPLES 33 to 37

Polymerization of a Hydrogenated Modified SEBS Polymer 5,000 g of cyclohexane, 400 g of styrene, 150 g of tetrahydrofuran, and 1.3 g of n-BuLi were added to a reactor having an inner volume of 10 L replaced with nitrogen, and polymerization was performed at initiation temperature of 50° C. After completion of the reaction, a temperature was maintained at 20° C., and 500 g of 1,3-butadiene was added to perform adiabatic polymerization. 30 minutes later, 100 g of styrene was added, and polymerization was continued. Then, 4.0 g of methyltriphenoxysilane was added and reacted to active points of the polymer for 30 minutes. Then, the reaction solution was maintained at 70° C. and hydrogen was introduced in the system. Then, 0.4 g of the catalyst A prepared in Experimental Example 1 and 0.15 g of n-BuLi were added, which was reacted for 1 hour while maintaining a hydrogen pressure at 1.0 MPa. After the reaction, the reaction solution was returned to a normal temperature and a normal pressure, and was removed from the reactor. The reaction solution was placed into water while stirring, and the solvent was removed by water steam distillation to obtain a hydrogenated modified SEBS polymer (I-16). The hydrogenation rate of the resulting hydrogenated modified SEBS polymer was 98%, the weight-average molecular weight was about 140 thousands, the coupling rate was 23.7%, and MFR measured at 230° C. and a load of 2.16 kg was 0.5 g/10 min. The modified rate was obtained by absorption derived from a phenoxy group at 1250 cm$^{-1}$ in infrared spectrum measured after purification of the polymer and found to be 0.86/polymer.

In addition, by varying a kind of a modifier, a kind of a monomer, an amount of a monomer, an amount of a catalyst, a polymerization temperature, a polymerization time and the like so that hydrogenated modified SEBS polymers can be obtained as shown in Table 8, hydrogenated modified SEBS polymers (I-17 to 20) of Examples 34 to 37 were obtained according to the same manner as that for the hydrogenated modified SEBS polymer (I-16) of Example 33. The modified rates in the case where modified compounds (j) to (l) were used were obtained by determining an amino group according to an amine titration method described in Anal. Chem. 564(1952) explained in Experimental Example 1.

TABLE 8

|  | Example |  |  |  |  |
|---|---|---|---|---|---|
|  | 33 | 34 | 35 | 36 | 37 |
| Component (I) | I-16 | I-17 | I-18 | I-19 | I-20 |
| Copolymer structure before hydrogenation |  |  |  |  |  |
| Styrene (wt %) | 50 | 15 | 15 | 15 | 15 |
| Butadiene (wt %) | 50 | 85 | 85 | 85 | 85 |
| 1,2-Bond content (%) | 80 | 78 | 78 | 78 | 78 |
| Weight-average molecular weight (× 10$^4$) | 13 | 13 | 13 | 13 | 13 |
| Modifier used | (i) | (i) | (j) | (k) | (l) |
| Content (wt %) | 0.40 | 0.38 | 0.19 | 0.20 | 0.42 |
| Content (mol %) | 100 | 100 | 50 | 50 | 100 |
| Hydrogenated modified SEBS polymer |  |  |  |  |  |
| Hydrogenation rate (%) | 97 | 97 | 95 | 96 | 98 |
| MFR (g/10 min.) | 0.5 | 3.8 | 7.9 | 5.2 | 4.2 |

TABLE 8-continued

|  | Example | | | | |
|---|---|---|---|---|---|
|  | 33 | 34 | 35 | 36 | 37 |
| Weight-average molecular weight (× 10⁴) | 14 | 14 | 13 | 14 | 15 |
| Coupling rate (%) | 24 | 20 | 7.0 | 18 | 24 |
| Modified rate (number/polymer) | 0.86 | 0.89 | 0.34 | 0.48 | 0.78 |

(i): methyltriphenoxysilane
(j): N,N-bis(trimethylsilyl)aminopropyldimethylethoxysilane
(k): N,N-bis(trimethylsilyl)aminopropylmethyldimethoxysilane
(l): N,N-bis(trimethylsilyl)aminopropylmethyldiethoxysilane Upon evaluation of hydrogenated modified polymers (I-16 to 20), as Comparative Example, unmodified hydrogenatd polymers (⑥ to ⑦) shown in Table 9 were prepared.

TABLE 9

| Unmodified hydrogenated polymer | ⑥ | ⑦ |
|---|---|---|
| Copolymer structure before hydrogenation | SEBS | SEBS |
| Styrene (wt %) | 50 | 15 |
| Butadiene (wt %) | 50 | 85 |
| 1,2-Bond content (%) | 80 | 78 |
| Weight-average molecular weight (×10⁴) | 10 | 13 |
| Hydrogenated polymer | | |
| Hydrogenation rate (%) | 98 | 98 |
| MFR (g/10 min.) | 3.6 | 15.7 |

2-2. Evaluation of Physical Properties

Using hydrogenated modified polymers (I-16 to 20) obtained by the above-mentioned method, mixing was performed according to the formulation shown in Table 10. As the Component (II-1), polypropylene (Trade name; "K1016" Chisso Corp.) was used. And as the Component (II-2), polyethylene terephthalate (Trade name; "RT523C" Nippon Unipet Co. Ltd.) was used. Unmodified hydrogenated polymers ⑥ and ⑦ shown in the following Table 9. The resulting mixture was melt and kneaded using a biaxial extruder into a composition and converted into pellets. Then, the pellets were used to make test pieces for evaluation of physical properties by injection molding. Then, physical properties of each test piece of Examples 38 to 42 and Comparative Examples 10 to 12 were measured by the method described in Experimental Example 1. The results are shown in Table 10.

TABLE 10

|  | Example | | | | | Comparative example | | |
|---|---|---|---|---|---|---|---|---|
|  | 38 | 39 | 40 | 41 | 42 | 10 | 11 | 12 |
| Component (I) | I-16 | I-17 | I-18 | I-19 | I-20 | — | — | — |
| Content of Component (I) (wt %) | 5 | 5 | 5 | 5 | 5 | — | — | — |
| Unmodified hydrogenated polymer | — | — | — | — | — | — | ⑥ | ⑦ |
| Content of unmodified hydrogenated polymer (wt %) | — | — | — | — | — | — | 5 | 5 |
| Content of Component (II-1) (wt %) | 80 | 80 | 80 | 80 | 80 | 85 | 80 | 80 |
| Content of Component (II-2) (wt %) | 15 | 15 | 15 | 15 | 15 | 15 | 15 | 15 |
| Rigidity (MPa) | 1,470 | 1,250 | 1,100 | 1,080 | 1,220 | 1,740 | 1,440 | 1,270 |
| Impact resistance (kgcm/cm) | 7.8 | 8.8 | 5.2 | 6.2 | 8.2 | 2.3 | 2.4 | 3.4 |
| Falling weight impact strength (kgcm/cm) | 1,800 | 2,460 | 1,320 | 1,890 | 2,200 | 30 | 380 | 680 |
| Tensile breaking extension (%) | 950 | more than 1,000 | 810 | more than 1,000 | 920 | 190 | 550 | 630 |
| Image clarity | ○ | ○ | ○ | ○ | ○ | Δ | Δ | Δ |
| Peeling between layers | ○ | ○ | ○ | ○ | ○ | X | X | X |

Then, using the hydrogenated modified polymers (I-18 to 20) by the above-mentioned method, mixing was performed according to the formulation shown in Table 11. As the Component (II-1), polypropylene (Trade name; "K8017" Chisso Co. Ltd.) was used. And as the Component (III), magnesium hydroxide (Trade name; "Kisma 5PH" Kyowa Kagaku Co. Ltd.) imparting the flame retardancy was used. These components were mixed using a uniaxial extruder adjusted at 220° C. into a composition, which was extrusion-molded to obtain test pieces for evaluation of physical properties. Performance evaluation was carried out on each test piece of Examples 43 to 45 and Comparative Example 13 by the method described in Experimental Example 1. The results are shown in the following Table 11. MFR was measured at 230° C. and a load of 10 kg.

TABLE 11

|  | Example | | | Comparative |
|---|---|---|---|---|
|  | 43 | 44 | 45 | 13 |
| Component (I) | I-18 | I-19 | I-20 | — |
| Content of Component (I) (wt %) | 25 | 25 | 25 | — |
| Unmodified hydrogenated polymer | — | — | — | ⑦ |
| Content of unmodified hydrogenated polymer (wt %) | — | — | — | 25 |
| Content of Component (II-1) (wt %) | 15 | 15 | 15 | 15 |
| Content of Component (III) (wt %) | 60 | 60 | 60 | 60 |
| MFR (g/10 min.) | 38 | 31 | 30 | 44 |
| Tensile breaking strength (MPa) | 9.8 | 13.5 | 15.2 | 7.9 |
| Tensile breaking extension (%) | 280 | 250 | 300 | 260 |

Using the hydrogenated modified polymers (I-4 to 6) by the above-mentioned method, mixing was performed according to the formulation shown in Tables 12 and 13. As the Component (II-1), polypropylene (Trade name; "K1016" Chisso Corp.) was used. As the Component (II-2), polyethylene terephthalate (Trade name; "RT523C" Nippon Unipet Co. Ltd.) was used. And as an antioxidant, pentaerythritol tetrakis[3-(3,5-di-t-butyl-4-hydroxyphenyl)propionate] (Trade name; "IRGANOX 1010" Ciba Specialty Chemicals Co. Ltd.) was used. These components were mixed using a biaxial extruder into a composition and converted into pellets. Then, the pellets were used to make test pieces for evaluation of physical properties by injection molding. Then, physical properties of each test piece of Examples 46 to 56 and Comparative Examples 14 to 16 were measured by the method described in Experimental Example 1. The results are shown in Tables 12 and 13.

Using the hydrogenated modified polymers (I-4 to 6) by the above-mentioned method, mixing was performed according to the formulation shown in Table 14. As the Component (II-1), polypropylene (Trade name; "K1016" Chisso Corp.) was used. As the Component (II-2), polybutylene terephthalate (Trade name; "Toraycone 1401X06" TORAY Co. Ltd.) was used. And as an antioxidant, "IRGANOX 1010" was used. These components were mixed using a biaxial extruder into a composition and converted into pellets. Then, the pellets were used to make test pieces for evaluation of physical properties by injection molding. Then, physical properties of each test piece of Examples 57 to 62 were measured by the method described in Experimental Example 1. The results are shown in Table 14. Also, Comparative Examples 17 to 20 which are not containing the above-mentioned hydrogenated modified polymers are shown in Table 15.

TABLE 12

| | Example | | | | | | |
|---|---|---|---|---|---|---|---|
| | 46 | 47 | 48 | 49 | 50 | 51 | 52 |
| Component (I) | I-4 | I-5 | I-6 | I-4 | I-5 | I-6 | I-4 |
| Content of Component (I) (wt %) | 10 | 10 | 10 | 10 | 10 | 10 | 5 |
| Content of Component (II-1) (wt %) | 60 | 60 | 60 | 30 | 30 | 30 | 15 |
| Content of Component (II-2) (wt %) | 30 | 30 | 30 | 60 | 60 | 60 | 80 |
| Content of antioxidant (wt %) | 0.2 | 0.2 | 0.2 | 0.2 | 0.2 | 0.2 | 0.2 |
| Rigidity (MPa) | 1,410 | 1,300 | 1,350 | 1,820 | 1,700 | 1,740 | 2,010 |
| Impact resistance (kgcm/cm) | 8.6 | 12.2 | 13.6 | 16.4 | 22.3 | 23.7 | 19.6 |
| Falling weight impact strength (kgcm/cm) | 2,340 | 2,430 | 2,480 | 2,620 | 2,640 | 2,730 | 2,730 |
| Tensile breaking extension (%) | 640 | 950 | 960 | 880 | 900 | 920 | 840 |
| Image clarity | ○ | ○ | ○ | ○ | ○ | ○ | ○ |
| Peeling between layers | ○ | ○ | ○ | ○ | ○ | ○ | ○ |

TABLE 13

| | Example | | | | Comparative example | | |
|---|---|---|---|---|---|---|---|
| | 53 | 54 | 55 | 56 | 14 | 15 | 16 |
| Component (I) | I-5 | I-6 | I-5 | I-5 | — | — | — |
| Content of Component (I) (wt %) | 5 | 5 | 5 | 40 | 0 | 0 | 0 |
| Content of Component (II-1) (wt %) | 15 | 15 | 65 | 40 | 60 | 30 | 15 |
| Content of Component (II-2) (wt %) | 80 | 80 | 30 | 20 | 30 | 60 | 80 |
| Content of antioxidant (wt %) | 0.2 | 0.2 | 0.2 | 0.2 | 0.2 | 0.2 | 0.2 |
| Rigidity (MPa) | 1,900 | 1,960 | 1,420 | 300 | 1,830 | 2,100 | 2,300 |
| Impact resistance (kgcm/cm) | 25.6 | 27.2 | 6.8 | No breaking | 2.2 | 2.7 | 3.4 |
| Falling weight impact strength (kgcm/cm) | 2,870 | 3,010 | 1,320 | 1,200 | 30 | 60 | 10 |
| Tensile breaking extension (%) | 860 | 910 | 420 | 880 | 140 | 10 | 10 |
| Image clarity | ○ | ○ | ○ | ○ | Δ | Δ | Δ |
| Peeling between layers | ○ | ○ | ○ | ○ | X | X | X |

TABLE 14

| | Example | | | | | |
|---|---|---|---|---|---|---|
| | 57 | 58 | 59 | 60 | 61 | 62 |
| Component (I) | I-4 | I-5 | I-6 | I-5 | I-5 | I-5 |
| Content of Component (I) (wt %) | 10 | 10 | 10 | 5 | 10 | 5 |
| Content of Component (II-1) (wt %) | 60 | 60 | 60 | 80 | 30 | 15 |
| Content of Component (II-2) (wt %) | 30 | 30 | 30 | 15 | 60 | 80 |
| Content of antioxidant (wt %) | 0.2 | 0.2 | 0.2 | 0.2 | 0.2 | 0.2 |
| Rigidity (MPa) | 1,380 | 1,280 | 1,320 | 1,120 | 1,680 | 1,860 |
| Impact resistance (kgcm/cm) | 7.8 | 10.2 | 11 | 8.1 | 20.8 | 24.3 |
| Falling weight impact strength (kgcm/cm) | 2,120 | 2,180 | 2,240 | 2,210 | 2,610 | 2,780 |

TABLE 14-continued

|  | Example | | | | | |
| --- | --- | --- | --- | --- | --- | --- |
|  | 57 | 58 | 59 | 60 | 61 | 62 |
| Tensile breaking extension (%) | 560 | 870 | 880 | 920 | 870 | 850 |
| Image clarity | ○ | ○ | ○ | ○ | ○ | ○ |
| Peeling between layers | ○ | ○ | ○ | ○ | ○ | ○ |

TABLE 15

|  | Comparative example | | | |
| --- | --- | --- | --- | --- |
|  | 17 | 18 | 19 | 20 |
| Component (I) | — | — | — | — |
| Content of Component (I) (wt %) | 0 | 0 | 0 | 0 |
| Content of Component (II-1) (wt %) | 60 | 80 | 30 | 15 |
| Content of Component (II-2) (wt %) | 30 | 15 | 60 | 80 |
| Content of antioxidant (wt %) | 0.2 | 0.2 | 0.2 | 0.2 |
| Rigidity (MPa) | 1,810 | 1,700 | 2,050 | 2,240 |
| Impact resistance (kgcm/cm) | 2.1 | 2.4 | 2.5 | 2.9 |
| Falling weight impact strength (kgcm/cm) | 30 | 40 | 30 | 50 |
| Tensile breaking extension (%) | 120 | 200 | 40 | 20 |
| Image clarity | Δ | Δ | Δ | Δ |
| Peeling between layers | X | X | X | X |

TABLE 17

|  | Comparative example | | | |
| --- | --- | --- | --- | --- |
|  | 21 | 22 | 23 | 24 |
| Component (I) | — | — | — | — |
| Content of Component (I) (wt %) | 0 | 0 | 0 | 0 |
| Content of Component (II-1) (wt %) | 15 | 30 | 60 | 80 |
| Content of Component (II-2) (wt %) | 80 | 60 | 30 | 15 |
| Content of antioxidant (wt %) | 0.2 | 0.2 | 0.2 | 0.2 |
| Rigidity (MPa) | 2,740 | 2,310 | 2,050 | 1,920 |
| Impact resistance (kgcm/cm) | 4.6 | 4 | 2.1 | 2.3 |
| Falling weight impact strength (kgcm/cm) | 60 | 70 | 30 | 40 |
| Tensile breaking extension (%) | 10 | 20 | 40 | 60 |
| Image clarity | Δ | Δ | Δ | Δ |
| Peeling between layers | X | X | X | X |

Using the hydrogenated modified polymers (I-4 and 5) by the above-mentioned method, mixing was performed according to the formulation shown in Table 16. As the Component (II-1), polypropylene (Trade name; "K1016" Chisso Corp.) was used. As the Component (II-2), polyamide (Trade name; "T802" TOYOBO Co. Ltd.) was used. And as an antioxidant, "IRGANOX 1010" was used. These components were mixed using a biaxial extruder into a composition and converted into pellets. Then, the pellets were used to make test pieces for evaluation of physical properties by injection molding. Then, physical properties of each test piece of Examples 63 to 68 were measured by the method described in Experimental Example 1. The results are shown in Table 16. Also, Comparative Examples 21 to 24 which are not containing the above-mentioned hydrogenated modified polymers are shown in Table 17.

Using the hydrogenated modified polymers (I-4 to 6) by the above-mentioned method, mixing was performed according to the formulation shown in Table 18. As the Component (II-1), polypropylene (Trade name; "K1016" Chisso Corp.) was used. As the Component (II-2), polymethylmethacrylate (Trade name; "Parapet G" KURARE Co. Ltd.) was used. And as an antioxidant, "IRGANOX 1010" was used. These components were mixed using a biaxial extruder into a composition and converted into pellets. Then, the pellets were used to make test pieces for evaluation of physical properties by injection molding. Then, physical properties of each test piece of Examples 69 to 72 were measured by the method described in Experimental Example 1. The results are shown in Table 18. Comparative Examples 25 and 26 which are not containing the above-mentioned hydrogenated modified polymers are also shown in Table 18.

TABLE 16

|  | Example | | | | | |
| --- | --- | --- | --- | --- | --- | --- |
|  | 63 | 64 | 65 | 66 | 67 | 68 |
| Component (I) | I-4 | I-5 | I-6 | I-5 | I-5 | I-5 |
| Content of Component (I) (wt %) | 5 | 5 | 5 | 10 | 10 | 5 |
| Content of Component (II-1) (wt %) | 15 | 15 | 15 | 30 | 60 | 80 |
| Content of Component (II-2) (wt %) | 80 | 80 | 80 | 60 | 30 | 15 |
| Content of antioxidant (wt %) | 0.2 | 0.2 | 0.2 | 0.2 | 0.2 | 0.2 |
| Rigidity (MPa) | 2,420 | 2,300 | 2,360 | 2,010 | 1,780 | 1,610 |
| Impact resistance (kgcm/cm) | 6.4 | 7.7 | 8.2 | 10.5 | 8.2 | 7.7 |
| Falling weight impact strength (kgcm/cm) | 3,130 | 3,300 | 3,320 | 3,120 | 2,420 | 2,350 |
| Tensile breaking extension (%) | 70 | 110 | 110 | 70 | 230 | 350 |
| Image clarity | ○ | ○ | ○ | ○ | ○ | ○ |
| Peeling between layers | ○ | ○ | ○ | ○ | ○ | ○ |

TABLE 18

|  | Example | | | | Comparative | |
|---|---|---|---|---|---|---|
|  | 69 | 70 | 71 | 72 | 25 | 26 |
| Component (I) | I-4 | I-5 | I-6 | I-5 | — | — |
| Content of Component (I) (wt %) | 10 | 10 | 10 | 5 | 0 | 0 |
| Content of Component (II-1) (wt %) | 60 | 60 | 60 | 80 | 60 | 80 |
| Content of Component (II-2) (wt %) | 30 | 30 | 30 | 15 | 30 | 15 |
| Content of antioxidant (wt %) | 0.2 | 0.2 | 0.2 | 0.2 | 0.2 | 0.2 |
| Rigidity (MPa) | 1,800 | 1,700 | 1,760 | 1,500 | 2,000 | 1,800 |
| Impact resistance (kgcm/cm) | 6.8 | 8.6 | 9.2 | 7.5 | 1.9 | 3 |
| Falling weight impact strength (kgcm/cm) | 2,140 | 2,320 | 2,410 | 2,260 | 50 | 50 |
| Tensile breaking extension (%) | 320 | 400 | 420 | 800 | 10 | 120 |
| Image clarity | ◯ | ◯ | ◯ | ◯ | Δ | Δ |
| Peeling between layers | ◯ | ◯ | ◯ | ◯ | X | X |

Using the hydrogenated modified polymer (I-7) by the above-mentioned method, mixing was performed according to the formulation shown in Table 19. As the Component (II-1), high density polyethylene (Trade name; "HJ340" and "HF111" also Nihon Polychem Corp.) was used. As the Component (II-2), ethylene/vinyl alcohol copolymer (Trade name; "EP-F101" KURARE Co. Ltd.) was used. As an antioxidant, "IRGANOX 1010" was used. And as a catalyst, tin dibutyldilaurate (Wako Pure Chemical Industries, Ltd.) was used. These components were mixed using a biaxial extruder into a composition and converted into pellets. Then, the pellets were used to make test pieces for evaluation of physical properties by injection molding. Then, physical properties of each test piece of Examples 73 to 76 were measured by the method described in Experimental Example 1. The results are shown in Table 19. Also, Comparative Examples 27 to 29 which are not containing the above-mentioned hydrogenated modified polymers are shown in Table 19.

On the other hand, Comparative Example 1 which is containing only polyethylene terephthalate and not the Component (I) has the higher rigidity of 2,650 MPa but has the lower impact resistance of 3.8 kgcm/cm and the lower impact resistance of 2,830 kgcm/cm and the remarkably lower tensile breaking extension of 80% in comparison with Examples 16 to 18. Comparative Example 2 using an unmodified hydrogenated polymer shows that the image clarity is worse, peeling between layers is observed, the impact resistance is 5.0 kgcm/cm, the falling weight impact strength is 2,500 kgcm/cm, and the tensile breaking extension is 120 kgcm/cm. That is, it can be seen that Comparative Example 2 has slightly improved resistance to impact and breaking extension as compared with Comparative Example 1, while it is not a composition having the improving effects as compared with Examples 16 to 18.

In addition, based on the results shown in Table 5, Examples 19 to 28 which are polymer compositions containing the hydrogenated modified polymer of the present

TABLE 19

|  |  | Example | | | | Comparative example | | |
|---|---|---|---|---|---|---|---|---|
|  |  | 73 | 74 | 75 | 76 | 27 | 28 | 29 |
| Component (I) |  | I-7 | I-7 | I-7 | I-7 | — | — | — |
| Content of Component (I) (wt %) |  | 5 | 3 | 5 | 5 | 0 | 0 | 0 |
| Content of Component (II-1) (wt %) | HJ340 | 80 | 90 | 80 | — | 85 | 93 | — |
|  | HF111 | — | — | — | 80 | — | — | 85 |
| Content of Component (II-2) (wt %) |  | 15 | 7 | 15 | 15 | 15 | 7 | 15 |
| Content of antioxidant (wt %) |  | 0.2 | 0.2 | 0.2 | 0.2 | 0.2 | 0.2 | 0.2 |
| Content of catalyst (wt %) |  | 0.1 | 0.1 | — | 0.1 | 0.1 | 0.1 | 0.1 |
| Rigidity (MPa) |  | 800 | 780 | 900 | — | 1,140 | 1,050 | — |
| Impact resistance (kgcm/cm) |  | 10 | 9.6 | 6.4 | — | 4.1 | 4.5 | — |
| Tensile breaking extension (%) |  | 170 | 330 | 150 | 500 | 70 | 120 | 30 |
| Image clarity |  | ◯ | ◯ | ◯ | ◯ | X | X | X |
| Peeling between layers |  | ◯ | ◯ | ◯ | ◯ | X | X | X |

2-3. Effects of Above-Mentioned Examples

Based on the results shown in Table 4, Examples 16 to 18 whose contents of the Component (I) are in the range of the present invention have the rigidity of 2,150 MPa or more, the impact resistance of 9.2 kgcm/cm or more, the falling weight impact strength of 3,210 kgcm/cm or more and the tensile breaking extension of 740% or more and are excellent in the image clarity, and no peeling between layers was observed. Therefore, it can be seen that Examples 16 to 18 whose contents of the Component (I) are in the range of the present invention are hydrogenated modified polymer compositions excellent in the balance among the impact resistance, the strength and the adherability.

invention have the impact resistance of 6.1 MPa or more, the falling weight impact strength of 1,470 kgcm/cm or more and the tensile breaking extension of 750% or more. And they show the image clarity is excellent, no peeling between layers is observed. Therefore, it can be seen that, by inclusion of the hydrogenated modified polymer of the present invention, hydrogenated modified polymer compositions excellent in the balance among the impact resistance, the strength and the adherability can be obtained. In particular, it is seen that, Examples other than Example 26, that is, Examples using a hydrogenated modified polymer having a primary amino group and/or a secondary amino group are excellent in the impact resistance among Examples in Table 5. This demonstrates that the hydrogenated modified polymer modified having a primary amino group and/or a secondary amino group is particularly excellent.

To the contrary, based on the results shown in Table 6, it can be seen that, Comparative Example 3 which is a polymer composition containing no Component (I) and obtained by mixing two kinds of incompatible polymers, shows the high rigidity of 1,740 MPa, while the image clarity is worse, peeling between layers is observed, the impact resistance is as low as 2.3 kgcm/cm, the falling weight impact strength is 30 kgcm/cm, the tensile breaking extension is as remarkably as low as 190% as compared with Examples 19 to 28. On the other hand, Comparative Examples 4 to 8 using an unmodified hydrogenated polymer in place of a Component (I) have the impact resistance of 3.7 kgcm/cm or lower, the falling weight impact strength of 380 to 750 kgcm/cm and the tensile breaking extension of 550 to 700%. That is, it can be seen that Comparative Examples 4 to 8 have the improved the impact resistance and the falling weight impact strength as compared with Comparative Example 3, while they are a hydrogenated polymer composition still inferior in the improving effects and having no balance among physical properties as compared with Examples 19 to 28.

In addition, Based on the results shown in Table 7, Examples 29 to 32 which are hydrogenated modified polymer compositions containing the hydrogenated modified polymer of the present invention have the tensile breaking strength of 13.1 to 15.7 MPa and the tensile breaking extension of 250 to 300%. Therefore, it can be seen that Examples 29 to 32 are hydrogenated modified polymer compositions excellent in the tensile breaking strength and having the balance among physical properties. On the other hand, Comparative Example 9 using an unmodified hydrogenated polymer which is not the hydrogenated modified polymer of the present invention in place of the Component (I) has the tensile breaking strength of as low as 7.8 MPa, is inferior in the tensile breaking strength and has no balance among physical properties.

In addition, Based on the results shown in Table 10, Examples 38 to 42 which are hydrogenated modified polymer compositions containing the hydrogenated modified polymer of the present invention have large in the rigidity of 1,050 MPa or more, the impact resistance of 5.0 kgcm/cm or more, the falling weight impact strength of 1,300 kgcm/cm or more and the tensile breaking extension of 800% or more, and the image clarity is excellent, and no peeling between layers is observed. Therefore, it can be seen that Examples 38 to 42 are hydrogenated modified polymer compositions excellent in the balance among the impact resistance, the strength and the adherability.

To the contrary, it can be seen that, Comparative Example 10 which is a polymer composition containing no component (I) and obtained by mixing two kinds of incompatible polymers, shows the high rigidity of 1,740 MPa, while the image clarity is worse, peeling between layers is observed, the impact resistance is as low as 2.3 kgcm/cm, and the falling weight impact strength is as remarkably low as 30 kgcm/cm, and the tensile breaking extension is remarkably low as 190% as compared with Examples 38 to 42. On the other hand, Comparative Examples 11 and 12 using an unmodified hydrogenated polymer which is not the hydrogenated modified polymer of the present invention in place of the component (I), the image clarity is worse, peeling between layers is observed, the falling weight impact strength is 380 to 680 kgcm/cm, the tensile breaking extension is 550 to 630 kgcm/cm and, thus, the falling weight impact strength is improved as compared with Comparative Example 10 but the effects of improving the impact resistance are still inferior as compared with Examples 38 to 42.

Based on the results shown in Table 11, Examples 43 to 45 which are hydrogenated modified polymer compositions containing the hydrogenated modified polymer of the present invention have the tensile breaking strength of 9.0 to 15 MPa, the tensile breaking extension of 250 to 300%, and it is seen that the compositions are excellent in tensile breaking strength, and balance among physical properties. To the contrary, it is seen that Comparative Example 13 using an unmodified hydrogenated polymer which is not the hydrogenated polymer of the present invention in place of the Component (I) is a hydrogenated polymer composition having the low tensile breaking strength of 7.9 MPa, the inferior tensile breaking strength and no balance among physical properties.

Based on the results shown in Tables 12 and 13, Examples 46 to 56 which are hydrogenated modified polymer compositions containing the hydrogenated modified polymer of the present invention show excellent balance in physical properties such as rigidity, impact resistance, falling weight impact strength and tensile breaking extension and the image clarity is good, peeling between layers is not observed. But Comparative Examples 14 to 16 are low in impact resistance, falling weight impact strength and tensile breaking extension as compared with the above-mentioned Example, and the image clarity is not enough, peeling between layers is observed.

Based on the results shown in Tables 14 and 15, Examples 57 to 62 which are hydrogenated modified polymer compositions containing the hydrogenated modified polymer of the present invention show excellent balance in physical properties such as rigidity, impact resistance, falling weight impact strength and tensile breaking extension and the image clarity is good, peeling between layers is not observed. But Comparative Examples 17 to 20 are low in impact resistance, falling weight impact strength and tensile breaking extension as compared with the above-mentioned Example, and the image clarity is not enough, peeling between layers is observed.

Based on the results shown in Tables 16 and 17, Examples 63 to 68 which are hydrogenated modified polymer compositions containing the hydrogenated modified polymer of the present invention show excellent balance in physical properties such as rigidity, impact resistance, falling weight impact strength and tensile breaking extension and the image clarity is good, peeling between layers is not observed. But Comparative Examples 21 to 24 are low in impact resistance, falling weight impact strength and tensile breaking extension as compared with the above-mentioned Example, and the image clarity is not enough, peeling between layers is observed.

Based on the results shown in Table 18, Examples 69 to 72 which are hydrogenated modified polymer compositions containing the hydrogenated modified polymer of the present invention show excellent balance in physical properties such as rigidity, impact resistance, falling weight impact strength and tensile breaking extension and the image clarity is good, peeling between layers is not observed. But Comparative Examples 25 and 26 are low in impact resistance, falling weight impact strength and tensile breaking extension as compared with the above-mentioned Example, and the image clarity is not enough, peeling between layers is observed.

Based on the results shown in Table 19, Examples 73 to 75 which are hydrogenated modified polymer compositions containing the hydrogenated modified polymer of the present invention show excellent balance in physical properties such as impact resistance, falling weight impact strength and tensile breaking extension, and the image clarity is good, peeling between layers is not observed. But Comparative Examples 27 and 28 are low in impact resistance, falling weight impact strength and tensile breaking extension as compared with the above-mentioned Example. Example 76 shows excellent in tensile breaking extension, and the image clarity is good, peeling between layers is not observed. But Comparative Example 29 is low in tensile breaking extension as compared with Example 76, and the image clarity is not enough, peeling between layers is observed.

[3] EXPERIMENTAL EXAMPLE 3

3-1. Production of an Alkoxysilyl Group-Containing Hydrogenated Modified Conjugated Diene-Based Polymer and the Like 5,000 g of cyclohexane, 150 g of styrene, 150 g of tetrahydrofuran and 0.9 g of n-BuLi were added to a reactor having an inner volume of 10 L replaced with nitrogen, first stage polymerization was performed at a polymerization initiation temperature of 50° C. After completion of the reaction, a temperature was maintained at 20° C., and 690 g of 1,3-butadiene was added to perform adiabatically second stage polymerization for 30 minutes. Then, 150 g of styrene was added to perform third stage polymerization. After completion of the reaction, 10 g of 1,3-butadiene was added to perform fourth stage polymerization to obtain a resulting block copolymer. An aliquot of the block polymer had a vinyl bond of 80%, a weight-average molecular weight of about 110 thousands. And 3.9 g of methyltriphenoxysilane as a modifier was further added to the system, which was reacted for 30 minutes. After the reaction, temperature of the solution was maintained at 70° C. And 0.4 g of bis ($\eta^5$-cyclopentadienyl)titanium (tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain a polymer (I-21). The obtained polymer (I-21) had a hydrogenation rate of 98%, a weight-average molecular weight of about 120 thousands and an alkoxysilyl group content of 0.0161 mmol/g.

The above-mentioned alkoxysilyl group content (mmol/g) is determined by a calibration curve. The calibration curve is made by the analysis of absorption at about 1250 cm$^{-1}$ attributed to Si—OC$_6$H$_5$ bond in the modifier according to infrared spectrum. In the case the alkoxysilyl group in the modifier is Si—OCH$_3$, Si—OC$_2$H$_5$ or Si—OC(CH$_3$)$_2$ (C$_2$H$_5$), the content is determined by the absorption at about 1110 cm$^{-1}$. Determined value was divided by both number-average molecular weight (Mn) of the hydrogenated modified polymer represented as a standard polystyrene by GPC and molecular weight of the alkoxysilyl group, and it is defined as a content of the alkoxysilyl group.

By varying an amount of a polymerization initiator, a kind of a modifier, an amount of a monomer and the like so as to obtain a polymer structure in Table 20, polymers (I-22 to 26) were obtained according to the polymer (I-21). The polymer structure "A" shown in Table 20 means a styrene polymer block and the polymer structure "D" means a butadiene polymer block whose content of the vinyl bond is 25 to 90 wt %. And a hydrogenated polymer (I-27) using no modifiers was obtained in a similar way as above.

3-2. Production of an Alkoxysilyl Group-Containing Hydrogenated Modified Conjugated Diene-Based Polymer and the Like 5,000 g of cyclohexane, 300 g of 1,3-butadiene, 0.25 g of tetrahydrofuran and 0.9 g of n-BuLi were added to a reactor having an inner volume of 10 L replaced with nitrogen, first stage polymerization was performed at a polymerization initiation temperature of 70° C. An aliquot of the polymer had a vinyl bond of 10% after completion of the reaction. Then a temperature was maintained at 20° C., and 75 g of tetrahydrofuran was added, further added 700 g of 1,3-butadiene to perform adiabatically second stage polymerization. An aliquot of the block polymer had a vinyl bond of 80% after completion of the second stage reaction, and a weight-average molecular weight of about 140 thousands by GPC. And 2.1 g of methyltriphenoxysilane as a modifier was further added to the system, which was reacted for 30 minutes. After the reaction, temperature of the solution was maintained at 70° C. And 0.4 g of bis($\eta^5$-cyclopentadienyl) titanium (tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain a polymer (I-28). The obtained polymer (I-28) had a hydrogenation rate of 95%, a weight-average molecular weight of about 270 thousands and an alkoxysilyl group content of 0.003 mmol/g.

By varying an amount of a polymerization initiator, a kind of a modifier, an amount of a monomer and the like so as to obtain a polymer structure in Table 21, polymers (I-29 to 30) were obtained according to the polymer (I-28). And a hydrogenated polymer (I-31) using no modifiers was obtained in a similar way as above.

3-3. Production of an Alkoxysilyl Group-Containing Hydrogenated Modified Conjugated Diene-Based Polymer and the Like 5,000 g of cyclohexane, 150 g of 1,3-butadiene, 0.25 g of tetrahydrofuran and 0.95 g of n-BuLi were added to a reactor having an inner volume of 10 L replaced with nitrogen, first stage polymerization was performed at a polymerization initiation temperature of 70° C. An aliquot of the polymer had a vinyl bond of 10% after completion of the reaction. Then a temperature was maintained at 20° C., and 25 g of tetrahydrofuran was added, further added 690 g of 1,3-butadiene to perform adiabatically second stage polymerization for 30 minutes. Then 150 g of styrene was added to perform third stage polymerization. After completion of the reaction, 10 g of 1,3-butadiene was added to perform fourth polymerization. An aliquot of the block polymer had a vinyl bond of 65% after completion of the fourth stage polymerization, and a weight-average molecular weight of about 120 thousands by GPC. And 4.03 g of methyltriphenoxysilane as a modifier was further added to the system, which was reacted for 30 minutes. After the reaction, temperature of the solution was maintained at 70° C. And 0.4 g of bis($\eta^5$-cyclopentadienyl)titanium (tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain a polymer (I-32). The obtained polymer (I-32) had a hydrogenation rate of 95%, a weight-average molecular weight of about 130 thousands and an alkoxysilyl group content of 0.0148 mmol/g.

By varying an amount of a polymerization initiator, a kind of a modifier, an amount of a monomer and the like so as to obtain a polymer structure in Table 21, a polymer (I-33) was obtained according to the polymer (I-32). The polymer structure "A" shown in Table 21 means a styrene polymer block, the polymer structure "C" means a butadiene polymer block whose content of the vinyl bond is less than 25 wt % and the polymer structure "D" means a butadiene polymer block whose content of the vinyl bond is 25 to 90 wt %. And a hydrogenated polymer (I-34) using no modifiers was obtained in a similar way as above.

(III-A); Magnesium hydroxide surface-finished with a higher fatty acid (Trade name; "Kisma 5A" Kyowa Kagaku Co. Ltd.),
(III-B); Magnesium hydroxide surface-finished with a silane coupling agent (Trade name; "Kisma 5J" Kyowa Kagaku Co. Ltd.),
(III-C); Magnesium hydroxide surface-finished with a silane coupling agent (Trade name; "Kisma 5PH" Kyowa Kagaku Co. Ltd.),
(III-D); Magnesium hydroxide surface-finished with a higher fatty acid (Trade name; "N-1" Kamishima Kagaku Co. Ltd.),
(III-E); Magnesium hydroxide surface-finished with a higher fatty acid (Trade name; "N-4" Kamishima Kagaku Co. Ltd.), ① Tensile Breaking Strength and Tensile Extension It was measured by performing a tensile test using No. 3 dumbbell under the temperature condition at 23° C. accord-

TABLE 20

| Component (I) | I-21 | I-22 | I-23 | I-24 | I-25 | I-26 | I-27 |
|---|---|---|---|---|---|---|---|
| Polymer structure | A-D-A | A-D-A | A-D-A | A-D-A | A-D-A | A-D-A | A-D-A |
| Modifier used | (m) | (n) | (o) | (p) | (q) | (m) | — |
| Alkoxysilyl group content (mmol/100 g) | 1.61 | 0.78 | 0.85 | 0.75 | 1.64 | 1.68 | — |
| Vinyl bond content in (D) (%) | 80 | 78 | 78 | 78 | 78 | 65 | 80 |
| Styrene content (%) | 30.1 | 30.2 | 30 | 30 | 29.9 | 15.1 | 30.1 |
| Weight-average molecular weight (× $10^4$) | 12 | 12 | 12 | 12 | 12 | 12 | 12 |
| Hydrogenation rate (%) | 97 | 95 | 96 | 98 | 97 | 97 | 98 |

(m): methyltriophenoxysilane
(n): N,N-bis(trimethylsilyl)aminopropyltriethoxysilane
(o): N,N-bis(trimethylsilyl)aminopropylmethyldimethoxysilane
(p): N,N-bis(trimethylsilyl)aminopropylmethyldiethoxysilane
(q): methyldiethoxy(t-amiloxy)silane
(f): N,N-bis(trimethylsilyl)aminopropyltrimethoxysilane

TABLE 21

| Component (I) | I-28 | I-29 | I-30 | I-31 | I-32 | I-33 | I-34 |
|---|---|---|---|---|---|---|---|
| Polymer structure | C-D-C | C-D-C | C-D-C | C-D-C | C-D-A | C-D-A | C-D-A |
| Modifier used | (m) | (m) | (n) | — | (m) | (n) | — |
| Alkoxysilyl group content (mmol/100 g) | 0.3 | 0.42 | 0.45 | — | 1.48 | 1.3 | — |
| (C) content (%) | 30 | 30 | 15 | 30 | 15 | 20 | 15 |
| Vinyl bond content in (C) (%) | 10 | 13 | 15 | 11 | 10 | 20 | 11 |
| (D) content (%) | 70 | 70 | 85 | 70 | 69 | 59 | 69 |
| Vinyl bond content in (D) (%) | 80 | 65 | 40 | 75 | 65 | 80 | 65 |
| Styrene content (%) | — | — | — | — | 14.9 | 20 | 14.9 |
| Weight-average molecular weight (× $10^4$) | 27 | 25 | 22 | 25 | 13 | 15 | 15 |
| Hydrogenation rate (%) | 95 | 96 | 98 | 98 | 95 | 98 | 98 |

(m): methyltriophenoxysilane
(n): N,N-bis(trimethylsilyl)aminopropyltriethoxysilane 3-4. Evaluation of Physical Properties By using the Component (I-21 to 34), the Component (II-1) and the Component (III) below, compositions or test pieces are prepared to evaluate. As another hydrogenated polymer, maleic anhydride-modified styrene/ethylene-butylene/styrene block copolymer (Trade name; "Taftec M-1913" Asahi Kasei Corp.) was used and represented "MAH-SEBS" in the table. Further, as another polymer component, ethylene/vinyl acetate copolymer (Trade name; "Evaflex 460" Mitsui DuPont Polychemical Corp.) was used.

As the Component (II-1), olefin-based polymers, that is, polypropylene (Trade name; "K8017" Chisso Corp.) and polyethylene (Trade name; "ZF33" Nihon Polychem Corp.) were used.

As the Component (III), inorganic-based flame retardants below were used.

ing to JIS C3005. Criteria are as follows, that is, both 15 MPa or more of tensile strength and 150% or more of tensile extension are good (shown with the mark "○").

② Hardness (Shore D)

It was measured according to JIS K6253 in order to judge the pliability, and criterion is that 70 or less of the hardness is good (shown with the mark "○").

③ Insulation Resistance

After dipping a pressed sheet in a warm water of 70° C., it was took out and waterdrop on the sheet was wiped off. Then the volume peculiar resistance was measured. Criterion is that $1 \times 10^{13}$ Ω·cm or more is good (shown with the mark "○").

④ Heating Volume Attachment

The sheet with a length of 20 cm and a width of 5 mm was twisted around a 4 mm cylinder 6 times or more. And after holding 120° C. for 120 hours, what did not crack or break was considered as success (shown with the mark "○").

⑤ Low-temperature Volume Attachment

The sheet with a length of 20cm and a width of 5 mm was twisted around a 4 mm cylinder 6 times or more. And after holding −10° C. for 24 hours, what did not crack or break was considered as success (shown with the mark "○").

⑥ Heating Modification

A pressed molding was used and measured according to JIS C3005. 50% or less of the rate of thickness reduction was considered as success (shown with the mark "○").

⑦ Flame Retardancy

Inclination examination was performed according to JIS C3005. What disappeared naturally within 60 seconds was considered as success (shown with the mark "○").

EXAMPLE 77

30 parts by mass of (I-21) as the Component (I), 70 parts by mass of the above-mentioned polypropylene as the Component (II-1) and 100 parts by mass of the (III-A) as the Component (III) were kneaded at 200° C. and 200 rpm by using a biaxial extruder (Ikegai Corp.) whose diameter of a cylinder is 45 mm and whose L/D is 32, which was thereafter converted into pellets. Then, the pellets were used to make a test piece for evaluation of physical properties whose thickness is 2 mm by press molding at 200° C. Evaluation of physical properties was performed and the results are shown in Table 22.

EXAMPLES 78 to 94 and COMPARATIVE EXAMPLES 30 to 33

By using formulations shown in Tables 22 to 25, evaluations of physical properties were performed like the above and the results are shown in Tables 22 to 25.

TABLE 22

|  |  | Example |  |  |  |  |  |
|---|---|---|---|---|---|---|---|
|  |  | 77 | 78 | 79 | 80 | 81 | 82 |
| Component (I) |  | I-21 | I-22 | I-23 | I-24 | I-25 | I-26 |
| Content of Component (I) (wt %) |  | 30 | 30 | 30 | 30 | 30 | 30 |
| Content of Component (II-1) (wt %) | K8017 | 70 | 70 | 70 | 70 | 70 | 70 |
| Content of Component (III) (wt %) | III-A | 100 | 100 | 100 | 100 | 100 | 100 |
| Tensile breaking strength (MPa) |  | 17.5 ○ | 15.5 ○ | 17.8 ○ | 18.5 ○ | 16.5 ○ | 17.3 ○ |
| Tensile breaking extension (%) |  | 200 ○ | 160 ○ | 210 ○ | 190 ○ | 170 ○ | 180 ○ |
| Hardness (Shore D) |  | 63 ○ | 64 ○ | 63 ○ | 62 ○ | 60 ○ | 58 ○ |
| Insulation resistance (Ω · cm) |  | 1.50E+14 ○ | 1.70E+14 ○ | 1.30E+14 ○ | 2.00E+14 ○ | 3.40E+14 ○ | 2.60E+14 ○ |
| Winding while heating |  | ○ | ○ | ○ | ○ | ○ | ○ |
| Winding at low temperature |  | ○ | ○ | ○ | ○ | ○ | ○ |
| Thermal deformation (%) |  | 25 ○ | 20 ○ | 25 ○ | 30 ○ | 25 ○ | 20 ○ |
| Flame retardancy (sec.) |  | 35 ○ | 50 ○ | 45 ○ | 55 ○ | 35 ○ | 40 ○ |

TABLE 23

|  |  | Example |  |  |  |  |  |
|---|---|---|---|---|---|---|---|
|  |  | 83 | 84 | 85 | 86 | 87 | 88 |
| Component (I) |  | I-21 | I-21 | I-21 | I-21 | I-28 | I-29 |
| Content of Component (I) (wt %) |  | 30 | 30 | 30 | 30 | 30 | 30 |
| Content of Component (II-I) (wt %) | K8017 | 70 | 70 | 70 | 70 | 70 | 70 |
| Content of Component (III) (wt %) | III-A |  |  |  |  | 100 | 100 |
|  | III-B | 100 |  |  |  |  |  |
|  | III-C |  | 100 |  |  |  |  |
|  | III-D |  |  | 100 |  |  |  |
|  | III-E |  |  |  | 100 |  |  |
| Tensile breaking strength (MPa) |  | 19.5 ○ | 17.5 ○ | 15.5 ○ | 17 ○ | 15.5 ○ | 16.5 ○ |
| Tensile breaking extension (%) |  | 210 ○ | 320 ○ | 160 ○ | 190 ○ | 350 ○ | 320 ○ |
| Hardness (Shore D) |  | 62 ○ | 64 ○ | 61 ○ | 63 ○ | 62 ○ | 61 ○ |
| Insulation resistance (Ω · cm) |  | 1.70E+13 ○ | 7.00E+13 ○ | 5.70E+13 ○ | 1.70E+14 ○ | 2.30E+14 ○ | 5.00E+14 ○ |
| Winding while heating |  | ○ | ○ | ○ | ○ | ○ | ○ |
| Winding at low temperature |  | ○ | ○ | ○ | ○ | ○ | ○ |
| Thermal deformation (%) |  | 25 ○ | 20 ○ | 25 ○ | 25 ○ | 25 ○ | 15 ○ |
| Flame retardancy (sec.) |  | 40 ○ | 45 ○ | 30 ○ | 30 ○ | 40 ○ | 45 ○ |

TABLE 24

|  |  | Example | | | | | |
|---|---|---|---|---|---|---|---|
|  |  | 89 | 90 | 91 | 92 | 93 | 94 |
| Component (I) |  | I-30 | I-32 | I-33 | I-32 | I-28 | I-28 |
| Content of Component (I) (wt %) |  | 30 | 30 | 30 | 30 | 30 | 30 |
| Content of Component (II-1) (wt %) | K8017 | 70 | 70 | 70 |  | 40 | 40 |
|  | ZF33 |  |  |  | 70 | 30 |  |
| Content of Component (III) (wt %) | III-A | 100 | 100 | 100 | 100 | 100 | 100 |
| Content of ethylene/vinylacetate copolymer (wt %) |  |  |  |  |  |  | 30 |
| Tensile breaking strength (MPa) |  | 18.5 | 16.3 | 15.8 | 17.5 | 15.5 | 15.8 |
|  |  | ○ | ○ | ○ | ○ | ○ | ○ |
| Tensile breaking extension (%) |  | 280 | 250 | 280 | 350 | 270 | 250 |
|  |  | ○ | ○ | ○ | ○ | ○ | ○ |
| Hardness (Shore D) |  | 59 | 63 | 66 | 60 | 61 | 60 |
|  |  | ○ | ○ | ○ | ○ | ○ | ○ |
| Insulation resistance (Ω · cm) |  | 3.50E+14 | 2.50E+14 | 1.40E+14 | 7.00E+14 | 3.80E+14 | 1.50E+14 |
|  |  | ○ | ○ | ○ | ○ | ○ | ○ |
| Winding while heating |  | ○ | ○ | ○ | ○ | ○ | ○ |
| Winding at low temperature |  | ○ | ○ | ○ | ○ | ○ | ○ |
| Thermal deformation (%) |  | 10 | 20 | 20 | 45 | 25 | 25 |
|  |  | ○ | ○ | ○ | ○ | ○ | ○ |
| Flame retardancy (sec.) |  | 50 | 35 | 40 | 45 | 35 | 40 |
|  |  | ○ | ○ | ○ | ○ | ○ | ○ |

TABLE 25

|  |  | Comparative example | | | |
|---|---|---|---|---|---|
|  |  | 30 | 31 | 32 | 33 |
| Component (I) |  | I-27 | I-31 | I-34 | — |
| Content of Component (I) (wt %) |  | 30 | 30 | 30 |  |
| Content of MAH-SEBS (wt %) |  |  |  |  | 30 |
| Content of Component (II-1) (wt %) | K8017 | 70 | 70 |  | 70 |
|  | ZF33 |  |  | 70 |  |
| Content of Component (III) (wt %) | III-A | 100 | 100 | 100 | 100 |
| Tensile breaking strength (MPa) |  | 13.5 | 12.5 | 10.5 | 19.5 |
|  |  | X | X | X | ○ |
| Tensile breaking extension (%) |  | 140 | 200 | 145 | 50 |
|  |  | X | ○ | ○ | X |
| Hardness (Shore D) |  | 68 | 65 | 66 | 75 |
|  |  | ○ | ○ | ○ | X |
| Insulation resistance (Ω · cm) |  | 5.00E+12 | 1.50E+12 | 2.00E+12 | 3.20E+14 |
|  |  | X | X | X | ○ |
| Winding while heating |  | X | X | X | X |
| Winding at low temperature |  | X | X | X | X |
| Thermal deformation (%) |  | 60 | 60 | 65 | 25 |
|  |  | X | X | X | X |
| Flame retardance (sec.) |  | 65 | 35 | 40 | 40 |
|  |  | X | ○ | ○ | ○ |

3-5. Effects of Above-Mentioned Examples

According to the result in Tables 22 to 25, Examples 77 to 94 had 15 MPa or more of the tensile breaking strength, 150% or more of the tensile breaking extension, $1 \times 10^{13}$ Ω·cm or more of the volume peculiar resistance and the success of twisting test, heating modification and flame retardancy, and they are excellent compositions in the balance of physical properties. On the other hand, Comparative Examples 30 to 32 which used hydrogenated polymers besides the range of the present invention were not excellent polymer compositions in the balance of physical properties such as the tensile breaking strength, the heat resistance and the insulation property. Comparative Example 33 which is containing a maleic anhydride-modified hydrogenated conjugated diene-based copolymer was not also excellent polymer compositions in the balance of physical properties such as the tensile breaking extension, the pliability and the low-temperature volume attachment.

[4] Productions of Hydrogenated Modified Copolymers other than the Above-Mentioned Hydrogenated Modified Polymers

EXAMPLE 95

Production of a Hydrogenated Modified Random Copolymer 5,000 g of cyclohexane, 0.25 g of tetrahydrofuran, 700 g of 1,3-butadiene, 300 g of styrene and 0.9 g of n-BuLi were added to a reactor having an inner volume of 10 L replaced with nitrogen, and adiabatic polymerization was performed at initiation temperature of 40° C. to obtain a butadiene/styrene random copolymer. An aliquot of the butadiene/styrene random copolymer sampling had a 1,2-bond of 47%, the styrene bound content of 30.1% and a weight-average molecular weight measured with GPC of about 160 thousands. When 2.8 g of methyltriphenoxysilane was added to the system containing the butadiene/styrene random copolymer, yellow red color of living anion disappeared. Further, it was reacted for 30 minutes as it was. Then, according to the same manner as that of Example 33, a hydrogenating reaction was performed to obtain a hydrogenated modified random copolymer. The resulting hydrogenated modified random copolymer had a hydrogenation rate of 97%, a weight-average molecular weight of about 190 thousands, a coupling rate of 29.5° C., and MFR measured at 230° C. and a load of 2.16 kg of 7.4 g/10 min. In addition, a modified rate obtained by the same manner as that for Example 33 was 0.98/polymer.

EXAMPLE 96

Production of a Hydrogenated Modified Block Copolymer 5,000 g of cyclohexane, 950 g of 1,3-butadiene, 200 g of tetrahydrofuran and 1 g of n-BuLi were added to a reactor having an inner volume of 10 L replaced with nitrogen, which was adiabatically polymerized at initiation temperature of 10° C. Then 30 minutes later, 50 g of styrene was added, which was further polymerized to obtain a butadiene/styrene block copolymer. An aliquot of the butadiene/styrene block copolymer sampling had a 1,2-bond of 81%, the styrene bound content of 4.8%, and a weight-average molecular weight measured with GPC of about 120 thousands. Then, 3.6 g of dimethyldiphenoxysilane was added to the system containing the butadiene/styrene block copolymer, which was reacted for 30 minutes. Then, using a catalyst B in place of a catalyst A prepared in Experimental Example 1, a hydrogenating reaction was carried out according to the same manner as that of Example 33 to obtain a hydrogenated modified block copolymer. The resulting hydrogenated modified block copolymer had a hydrogenation rate of 98%, a weight-average molecular weight of about 130 thousands, a coupling rate of 19.7%, and MFR measured at 230° C. and a load of 2.16 kg of 10.5 g/10 min. In addition, a modified rate obtained by the same manner of Example 33 was 0.83/polymer.

The present invention is not always limited to the above-mentioned examples and has a variety of embodiments according to the objective or the use.

What is claimed is:

1. A hydrogenated modified polymer obtained by hydrogenating a modified polymer having at least one primary amino group and/or at least one secondary amino group in a conjugated diene-based polymer obtained by anion-polymerizing a conjugated diene or a conjugated diene and another monomer.

2. The hydrogenated modified polymer according to claim 1, wherein said modified polymer is obtained by anion-polymerization using at least one selected from the group consisting of polymerization initiators represented by the following general formulas (1) and (2), and a hydrogenated modified polymer is obtained by removing a protecting group bound to said modified polymer during the hydrogenation and/or after the hydrogenation.

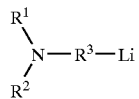

(1)

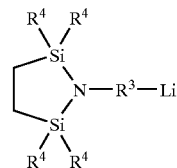

(2)

[In the general formula (1), both $R^1$ and $R^2$ are a trialkylsilyl group having a carbon number of 3 to 18, or one of them is the trialkylsilyl group and the other is an alkyl group having a carbon number of 1 to 20, an aryl group having a carbon number of 6 to 20, an aralkyl group having a carbon number of 7 to 20 or an organosiloxy group having a carbon number of 1 to 100. And, $R^3$ in the general formulas (1) and (2) is an alkylene group having a carbon number of 1 to 20 or an alkylidene group having a carbon number of 1 to 20. Further, $R^4$ in the general formula (2) is an alkyl group having a carbon number of 1 to 20, an aryl group having a carbon number of 6 to 20, an aralkyl group having a carbon number of 7 to 20 or an organosiloxy group having a carbon number of 1 to 100.]

3. The hydrogenated modified polymer according to claim 1, wherein said modified polymer is obtained by anion-polymerizing at least one selected from the group consisting of unsaturated monomers represented by the following general formulas (3) and (4), and a hydrogenated modified polymer is obtained by removing a protecting group bound to said modified polymer during the hydrogenation and/or after the hydrogenation.

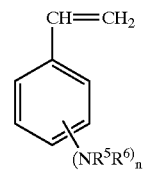

(3)

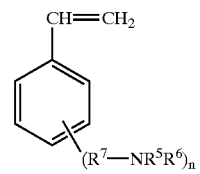

(4)

[In the general formulas (3) and (4), both $R^5$ and $R^6$ are a trialkylsilyl group having a carbon number of 3 to 18, or one of them is the trialkylsilyl group and the other is an alkyl group having a carbon number of 1 to 20, an aryl group having a carbon number of 6 to 20, aralkyl group having a carbon number of 7 to 20 or an organosiloxy group having a carbon number of 1 to 100. And $R^7$ in the general formula (4) is an alkylene group having a carbon number of 1 to 20 or an alkylidene group having a carbon number of 1 to 20. Further, n in the general formulas (3) and (4) is 1 to 3].

4. The hydrogenated modified polymer according to claim 1, wherein said modified polymer is obtained by reacting a polymerization terminator represented by the following general formula (5) to an active point of said conjugated diene-based polymer.

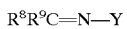

(5)

[In the general formula (5), $R^8$ and $R^9$ are respectively a hydrogen atom, an alkyl group having a carbon number of 1 to 20, an aryl group having a carbon number of 6 to 20, an aralkyl group having a carbon number of 7 to 20 or an organosiloxy group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number of 7 to 20 or an organosiloxy group having a carbon number of 1 to 100].

5. The hydrogenated modified polymer according to claim 1, wherein said conjugated diene-based polymer is a block copolymer containing 2 or more polymer blocks selected from the group consisting of (A) to (E) polymer blocks.

(A) an aromatic vinyl compound polymer block in which an aromatic vinyl compound is 80 wt % or more (B) a conjugated diene polymer block in which conjugated diene is 80 wt % or more (C) a conjugated diene polymer block in which a total of a 1,2-bond content and a 3,4-bond content is less than 25 wt %

(D) a conjugated diene polymer block in which a total of a 1,2-bond content and a 3,4-bond content is 25 wt % or more and not more than 90 wt %

(E) a random copolymer block of an aromatic vinyl compound and a conjugated diene.

6. A hydrogenated modified polymer obtained by polymerizing a conjugated diene or a conjugated diene and another monomer using an organic alkali metal compound as a polymerization initiator, adding an alkoxysilane compound to the resulting conjugated diene-based polymer to terminate the reaction to obtain a modified polymer, which is hydrogenated.

7. The hydrogenated modified polymer according to claim 6, wherein said alkoxysilane compound is a compound represented by the following general formula (6), and if a protecting group is in said modified polymer, a hydrogenated modified polymer is obtained by removing a protecting group bound to said modified polymer during the hydrogenation and/or after the hydrogenation.

$$R^{10}{}_{(4-m-n)}Si(OR^{11})_m X_n \qquad (6)$$

[In the general formula (6), $R^{10}$ is an alkyl group having a carbon number of 1 to 20, an aryl group having a carbon number of 6 to 20, an aralkyl group having a carbon number of 7 to 20 or an organosiloxy group having a carbon number of 1 to 100 and, when there are a plurality of $R^{10}$s, respective $R^{10}$s may be the same or different. And $R^{11}$ is an alkyl group having a carbon number of 1 to 20, an aryl group having a carbon number of 6 to 20 or an aralkyl group having a carbon number of 7 to 20 and, when there are a plurality of $R^{11}$s, respective $R^{11}$s may be the same or different. X is a substituent (provided that $OR^{11}$ is excluded) having a polar group containing at least one selected from the group consisting of a N atom, an O atom and a Si atom and, when there are a plurality of Xs, respective Xs may be the same or different, or respective Xs may be an independent substituent or form a cyclic structure. m is 1, 2, 3 or 4, and n is 0, 1, 2 or 3. The sum of m and n is 1 to 4.]

8. The hydrogenated modified polymer according to claim 6, wherein said conjugated diene-based polymer is a block copolymer containing 2 or more polymer blocks selected from the group consisting of (A) to (E) polymer blocks.

(A) an aromatic vinyl compound polymer block in which an aromatic vinyl compound is 80 wt % or more (B) a conjugated diene polymer block in which conjugated diene is 80 wt % or more (C) a conjugated diene polymer block in which a total of a 1,2-bond content and a 3,4-bond content is less than 25 wt %

(D) a conjugated diene polymer block in which a total of a 1,2-bond content and a 3,4-bond content is 25 wt % or more and not more than 90 wt %

(E) a random copolymer block of an aromatic vinyl compound and a conjugated diene.

9. A process for producing a hydrogenated modified polymer characterized in hydrogenating a modified polymer having an primary amino group and/or a secondary amino group in a conjugated diene-based polymer, obtained by anion-polymerizing a conjugated diene or a conjugated diene and another monomer.

10. The process for producing a hydrogenated modified polymer according to claim 9, wherein introduction of said primary amino group and/or said secondary amino group is performed using a polymerization initiator having an amino group.

11. The process for producing a hydrogenated modified polymer according to claim 10, wherein said polymerization initiator having an amino group is a polymerization initiator having an amino group in which a protecting group is bound to a nitrogen atom, and said protecting group in said modified polymer is removed during the hydrogenation and/or after the hydrogenation.

12. The process for producing a hydrogenated modified polymer according to claim 9, wherein said polymerization initiator having an amino group in which a protecting group is bound to a nitrogen atom is at least one selected from the group consisting of compounds represented by the following general formulas (7) and (8).

[In the general formula (7), both $R^1$ and $R^2$ are a trialkylsilyl group having a carbon number of 3 to 18, or one of them is the trialkylsilyl group and the other is an alkyl group having a carbon number of 1 to 20, an aryl group having a carbon number of 6 to 20, an aralkyl group having a carbon number of 7 to 20 or an organosiloxy group having a carbon number of 1 to 100. And, $R^3$ in the general formulas (7) and (8) is an alkylene group having a carbon number of 1 to 20 or an alkylidene group having a carbon number of 1 to 20. Further, $R^4$ in the general formula (8) is an alkyl group having a carbon number of 1 to 20, an aryl group having a carbon number of 6 to 20, an aralkyl group having a carbon number of 7 to 20 or an organosiloxy group having a carbon number of 1 to 100].

13. The process for producing a hydrogenated modified polymer according to claim 9, wherein introduction of said primary amino group and/or said secondary amino group is carried out by performing said anion polymerization of an unsaturated monomer having an amino group in which a protecting group is bound to a nitrogen atom, and said protecting group in said modified polymer is removed during the hydrogenation and/or after the hydrogenation.

14. The process for producing a hydrogenated modified polymer according to claim 13, wherein said unsaturated monomer having an amino group in which a protecting group is bound to a nitrogen atom is at least one selected from the group consisting of compounds represented by the following general formulas (9) and (10).

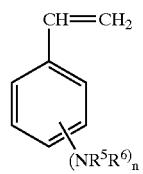

(9)

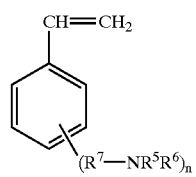

(10)

[In the general formulas (9) and (10), both $R^5$ and $R^6$ are a trialkylsilyl group having a carbon number of 3 to 18, or one of them is the trialkylsilyl group and the other is an alkyl group having a carbon number of 1 to 20, an aryl group having a carbon number of 6 to 20, aralkyl group having a carbon number of 7 to 20 or an organosiloxy group having a carbon number of 1 to 100. And $R^7$ in the general formula (10) is an alkylene group having a carbon number of 1 to 20 or an alkylidene group having a carbon number of 1 to 20. Further, n in the general formulas (9) and (10) is 1 to 3].

15. The process for producing a hydrogenated modified polymer according to claim 9, wherein introduction of said primary amino group and/or said secondary amino group is carried out by reacting a polymerization terminator represented by the following general formula (11) to an active point of said conjugated diene-based polymer.

$$R^8R^9C=N-Y \quad (11)$$

[In the general formula (11), $R^8$ and $R^9$ are respectively a hydrogen atom, an alkyl group having a carbon number of 1 to 20, an aryl group having a carbon number of 6 to 20, an aralkyl group having a carbon number of 7 to 20 or an organosiloxy group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number of 7 to 20 or an organosiloxy group having a carbon number of 1 to 100.]

16. A process for producing a hydrogenated modified polymer comprising:
a first step for polymerizing a conjugated diene or a conjugated diene and another monomer in an inert organic solvent using an organic alkali metal compound as a polymerization initiator,
a second step for terminating reaction by adding an alkoxysilane compound to the resulting conjugated diene-based polymer, and
a third step for hydrogenating the resulting modified polymer.

17. The process for producing a hydrogenated modified polymer according to claim 16, wherein said alkoxysilane compound is a compound represented by the following general formula (12), and if a protecting group is in said modified polymer, said protecting group is removed during the hydrogenation and/or after the hydrogenation.

$$R^{10}_{(4-m-n)}Si(OR^{11})_mX_n \quad (12)$$

[In the general formula (12), $R^{10}$ is an alkyl group having a carbon number of 1 to 20, an aryl group having a carbon number of 6 to 20, an aralkyl group having a carbon number of 7 to 20 or an organosiloxy group having a carbon number of 1 to 100 and, when there are a plurality of $R^{10}$s, respective $R^{10}$s may be the same or different. And $R^{11}$ is an alkyl group having a carbon number of 1 to 20, an aryl group having a carbon number of 6 to 20 or an aralkyl group having a carbon number of 7 to 20 and, when there are a plurality of $R^{11}$s, respective $R^{11}$s may be the same or different. X is a substituent (provided that $OR^{11}$ is excluded) having a polar group containing at least one selected from the group consisting of a N atom, an O atom and a Si atom and, when there are a plurality of Xs, respective Xs may be the same or different, or respective Xs may be an independent substituent or form a cyclic structure. m is 1, 2, 3 or 4, and n is 0, 1, 2 or 3. The sum of m and n is 1 to 4.]

18. A hydrogenated modified polymer composition comprising the hydrogenated modified polymer as defined in claim 1, and at least one selected from the group consisting of nonpolar polymer, polar polymer and filler.

19. The hydrogenated modified polymer composition according to claim 18, wherein said nonpolar polymer is at least one selected from the group consisting of polyolefin-based polymer and aromatic vinyl-based polymer, and said polar polymer is a polymer having at least one selected from the group consisting of carboxyl group (containing an acid anhydride and a carboxylic acid metal salt), hydroxyl group, halogen group, epoxy group, oxazolin group, sulfonic acid group, isocyanate group, thiol group, ester bond, carbonate bond, amide bond, ether bond, urethane bond and urea bond.

20. A hydrogenated modified polymer composition comprising the hydrogenated modified polymer as defined in claim 6, and at least one selected from the group consisting of nonpolar polymer, polar polymer and filler.

21. The hydrogenated modified polymer composition according to claim 20, wherein said nonpolar polymer is at least one selected from the group consisting of polyolefin-based polymer and aromatic vinyl-based polymer, and said polar polymer is a polymer having at least one selected from the group consisting of carboxyl group (containing an acid anhydride and a carboxylic acid metal salt), hydroxyl group, halogen group, epoxy group, oxazolin group, sulfonic acid group, isocyanate group, thiol group, ester bond, carbonate bond, amide bond, ether bond, urethane bond and urea bond.

* * * * *